US012555893B2

(12) United States Patent
Kim et al.

(10) Patent No.: US 12,555,893 B2
(45) Date of Patent: Feb. 17, 2026

(54) ANTENNA AND ELECTRONIC DEVICE COMPRISING SAME

(71) Applicant: SAMSUNG ELECTRONICS CO., LTD., Suwon-si (KR)

(72) Inventors: Youngjung Kim, Suwon-si (KR); Jonghyuck Lee, Suwon-si (KR); Youngjun Kim, Suwon-si (KR); Jongsuk Kim, Suwon-si (KR); Kyungbin Kim, Suwon-si (KR); Kwangseo Kim, Suwon-si (KR); Donghwan Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 221 days.

(21) Appl. No.: 18/244,039

(22) Filed: Sep. 8, 2023

(65) Prior Publication Data

US 2023/0420826 A1 Dec. 28, 2023

Related U.S. Application Data

(63) Continuation of application No. PCT/KR2022/002127, filed on Feb. 14, 2022.

(30) Foreign Application Priority Data

Mar. 9, 2021 (KR) ........................ 10-2021-0030897

(51) Int. Cl.
*H01Q 9/04* (2006.01)
*H01Q 1/24* (2006.01)
*H01Q 21/08* (2006.01)

(52) U.S. Cl.
CPC ........... *H01Q 1/243* (2013.01); *H01Q 9/0407* (2013.01); *H01Q 21/08* (2013.01)

(58) Field of Classification Search
CPC ....... H01Q 1/243; H01Q 9/0407; H01Q 21/08
See application file for complete search history.

(56) References Cited

U.S. PATENT DOCUMENTS 10,389,007 B1 8/2019 Choi et al.
10,476,170 B2 11/2019 Rajagopalan et al.
(Continued)

FOREIGN PATENT DOCUMENTS

CN 109088166 A 12/2018
CN 109546295 A 3/2019
(Continued)

OTHER PUBLICATIONS

European Search Report corresponding to Application No. 22767348.0-1201; Dated Jul. 1, 2024.
(Continued)

*Primary Examiner* — Jimmy T Vu
(74) *Attorney, Agent, or Firm* — CANTOR COLBURN LLP

(57) ABSTRACT

An electronic device according to various embodiments may comprise: a housing; an antenna structure comprising a substrate, which comprises a first substrate surface facing a first direction and a second substrate surface facing a second direction opposite from the first substrate surface, and at least one antenna element disposed on the substrate so as to form a beam pattern in the first direction; a first support part disposed so as to at least partially correspond to the second substrate surface; a conductive bracket comprising at least one conductive extension part disposed higher than the second substrate surface with respect to the first support part; and a wireless communication circuit configured to transmit and/or receive a wireless signal in a designated frequency band by means of the at least one antenna element.

20 Claims, 19 Drawing Sheets

(56) References Cited

U.S. PATENT DOCUMENTS

| | | | | |
|---|---|---|---|---|
| 10,826,162 | B1 | 11/2020 | Jeon et al. | |
| 2015/0214602 | A1 | 7/2015 | Hobson et al. | |
| 2017/0062899 | A1 | 3/2017 | Takahashi et al. | |
| 2018/0309185 | A1 | 10/2018 | Akiyama et al. | |
| 2020/0106167 | A1 | 4/2020 | Moon et al. | |
| 2020/0194879 | A1 | 6/2020 | Lim et al. | |
| 2020/0243948 | A1 | 7/2020 | Kim et al. | |
| 2020/0266521 | A1 | 8/2020 | Jeong et al. | |
| 2020/0266522 | A1 | 8/2020 | Moon et al. | |
| 2020/0329550 | A1 * | 10/2020 | Seo | H05K 1/0203 |
| 2020/0365984 | A1 | 11/2020 | Chen et al. | |
| 2021/0328362 | A1 | 10/2021 | Park et al. | |
| 2022/0200212 | A1 * | 6/2022 | Yi | G06F 1/1658 |

FOREIGN PATENT DOCUMENTS

| | | | |
|---|---|---|---|
| CN | 111987415 | A | 11/2020 |
| KR | 20100019789 | A | 2/2010 |
| KR | 101060457 | B1 | 8/2011 |
| KR | 20190140209 | A | 12/2019 |
| KR | 20200061178 | A | 6/2020 |
| KR | 20200092545 | A | 8/2020 |
| KR | 20200099813 | A | 8/2020 |
| KR | 20200101172 | A | 8/2020 |
| KR | 20200121037 | A | 10/2020 |
| KR | 20200131775 | A | 11/2020 |

OTHER PUBLICATIONS

International Search Report and Written Opinion for International Application No. PCT/KR2022/002127; International Filing Date Feb. 14, 2022; Date of Mailing May 19, 2022; 3 Pages.

Korean Office Action; Application No. 10-2021-0030897; filed Mar. 9, 2021; mailed May 25, 2025; 11 pages, with English Translation.

* cited by examiner

ANTENNA AND ELECTRONIC DEVICE COMPRISING SAME

CROSS-REFERENCE TO RELATED APPLICATIONS

This application is a continuation of International Application No. PCT/KR2022/002127, designating the United States, filed on Feb. 14, 2022, in the Korean Intellectual Property Receiving Office and claiming priority to Korean Patent Application No. 10-2021-0030897, filed on Mar. 9, 2021 in the Korean Intellectual Property Office, the disclosures of which are incorporated by reference herein in their entireties.

TECHNICAL FIELD

Various embodiments of the present disclosure relate to an antenna and an electronic device comprising the same.

BACKGROUND ART

With the development of wireless communication technology, electronic devices (e.g., electronic devices for communication) have become ubiquitous in daily life, and this has led to an exponential increase in content consumption. The rapid increase in content consumption is causing network capacity to gradually reach its limit, and since the commercialization of the 4G ($4^{th}$ generation) communication system, communication systems (e.g., 5G ($5^{th}$ generation), pre-5G communication system, or new radio (NR)) that use high-frequency (e.g., mmWave) bands (e.g., 3 GHz to 300 GHz bands) to transmit and/or receive signals are being researched to meet the increasing demand for wireless data traffic.

DISCLOSURE OF INVENTION

Technical Problem

The next-generation wireless communication technology can transmit and receive wireless signals using frequencies in the range of 3 GHz~100 GHz, and an efficient mounting structure and corresponding antenna structure (e.g., an antenna module) to overcome high free space losses from these relatively high frequency features and to increase the gain of the antenna are being developed. The antenna structure may include an array antenna in which various number of antenna elements (e.g., conductive patches and/or conductive patterns) are disposed at regular intervals. Such antenna elements may be disposed such that a beam pattern is formed in any one direction inside the electronic device. For example, the antenna structure may be disposed such that a beam pattern is formed toward at least a portion of the front surface, rear surface and/or side surface in the inner space of the electronic device.

The electronic device may include a conductive member (e.g., a metal member) disposed at least a portion of the housing and a non-conductive member (e.g., a polymer member) coupled to a conductive member for a rigidity reinforcement and a elegant appearance formation. Such a conductive member may be at least partially omitted in the portion facing the antenna structure disposed in the inner space of the electronic device, and the omitted portion may be replaced by a non-conductive member.

However, a conductive member located near the antenna structure and forming the boundary area by being combined with a non-conductive member may generate an eddy current or surface wave (e.g., trap current) because of its structural shape, and such an excitation current may be partially concentrated to the rear surface of the antenna structure, thereby degrading radiation performance (e.g., gain) in the front direction of the antenna structure.

To solve the problem of eddy currents (trap currents) caused by a conductive member being located near the antenna structure, the non-conductive member coupled with the conductive member may be extended to a position relatively far from the antenna structure. Unfortunately, this may cause a decrease in the rigidity of the electronic device.

Solution to Problem

Various embodiments of the present disclosure may provide an antenna configured to reduce radiation degradation through a support structure of the antenna structure that maintains rigidity and an electronic device comprising the same.

According to various embodiments, the electronic device may comprise: a housing comprising a conductive member and a non-conductive member coupled to the conductive member; an antenna structure disposed in the inner space of the housing, comprising a substrate that includes a first substrate surface facing a first direction, a second substrate surface facing a second direction opposite to the first substrate surface, and a substrate side surface surrounding a space between the first substrate surface and the second substrate surface, and at least one antenna element disposed to form a beam pattern in the first direction; a first support part disposed to at least partially correspond to the second substrate surface in the inner space of the housing; a conductive bracket comprising at least one conductive extension part disposed higher than the second substrate surface in a direction perpendicular to the first direction from the first support; and a wireless communication circuit configured to transmit and/or receive a radio signal in a frequency band specified through the at least one antenna element, and when the housing is viewed from the outside, the antenna structure may be disposed at a position overlapping at least partially with the non-conductive member.

Advantageous Effects of Invention

The antenna structure according to an exemplary embodiment of the present disclosure may receive help to improve the radiation performance (e.g., gain) in a front direction by reducing a phenomenon in which the peripheral excitation current is concentrated to the rear surface of the antenna structure through at least one conductive extension part disposed higher than the antenna from the conductive bracket supporting the substrate.

In addition, various effects that are directly or indirectly identified through this document may be provided.

BRIEF DESCRIPTION OF DRAWINGS

In connection with the description of the drawings, the same or similar reference numerals may be used for the same or similar elements.

MODE FOR THE INVENTION

Figure 1:
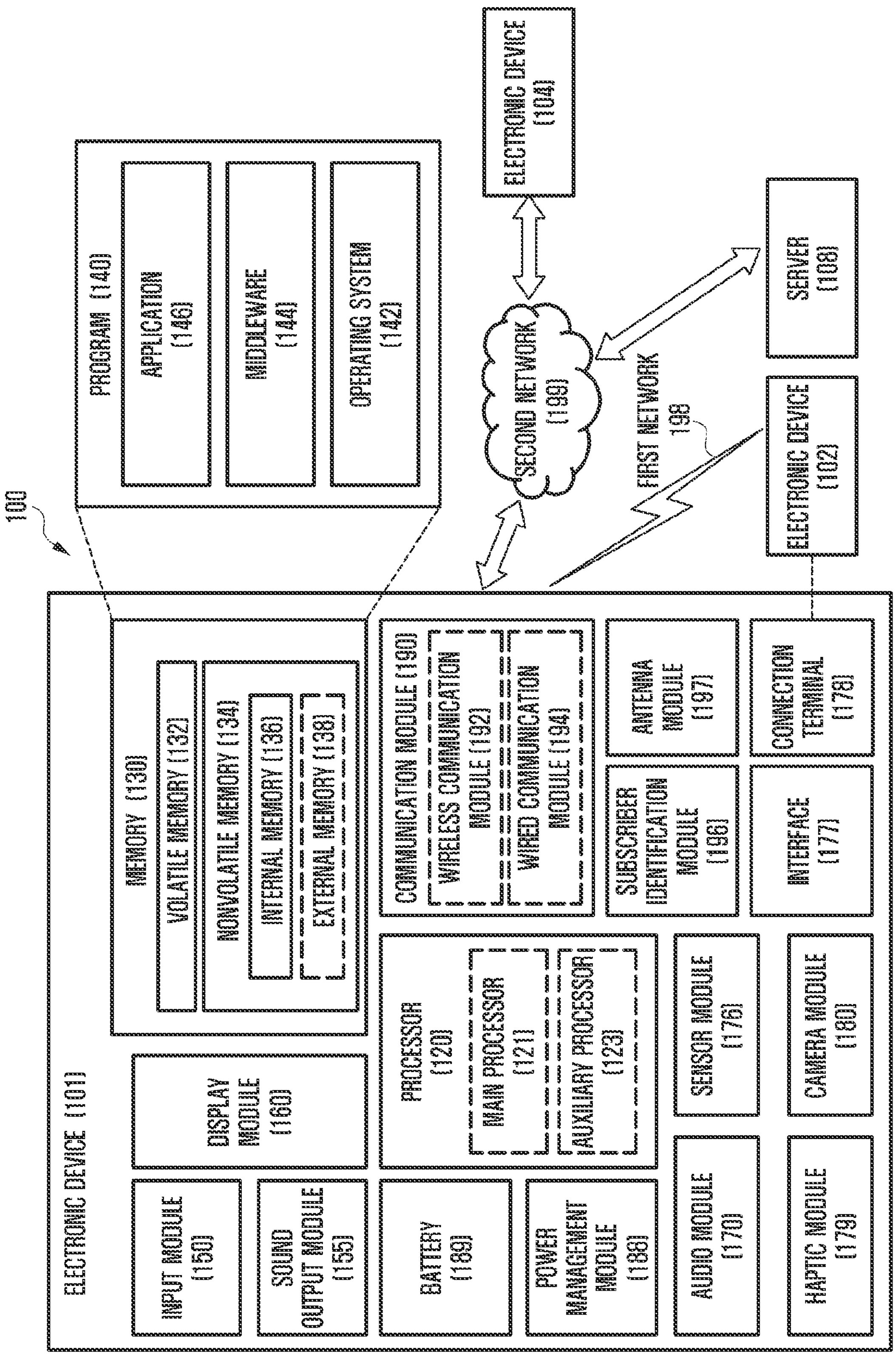
FIG. 1 is a block diagram of an electronic device in a network environment according to various embodiments of the present disclosure.

FIG. 1 is a block diagram illustrating an electronic device 101 in a network environment 100 according to various embodiments.

With reference to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to one embodiment, the electronic device 101 may communicate with the electronic device 104 via the server 108. According to one embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, For example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to one embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one embodiment, the auxiliary processor 123 (e.g., an image signal processor or a communication processor) may be implemented as part of another component (e.g., the camera module 180 or the communication module 190) functionally related to the auxiliary processor 123. According to one embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, For example, software (e.g., the program 140) and input data or output data for a command related thererto. The memory 130 may include the volatile memory 132 or the non-volatile memory 134.

The program 140 may be stored in the memory 130 as software, and may include, For example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, For example, a microphone, a mouse, a keyboard, a key (e.g., a button), or a digital pen (e.g., a stylus pen).

The sound output module 155 may output sound signals to the outside of the electronic device 101. The sound output module 155 may include, For example, a speaker or a receiver. The speaker may be used for general purposes, such as playing multimedia or playing record. The receiver may be used for receiving incoming calls. According to one embodiment, the receiver may be implemented as separate from, or as part of the speaker.

The display module 160 may visually provide information to the outside (e.g., a user) of the electronic device 101. The display module 160 may include, For example, a display, a hologram device, or a projector and control circuitry to control a corresponding one of the display, hologram device, and projector. According to one embodiment, the display module 160 may include a touch sensor adapted to detect a touch, or a pressure sensor adapted to measure the strength of force incurred by the touch.

The audio module 170 may convert a sound into an electrical signal and vice versa. According to one embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one embodiment, the sensor module 176 may include, For example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to one embodiment, the interface 177 may include, For example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one embodiment, the connecting terminal 178 may include, For example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one embodiment, the haptic module 179 may include, For example, a motor, a piezoelectric element, or an electric stimulator.

The camera module 180 may capture a still image or moving images. According to one embodiment, the camera module 180 may include one or more lenses, image sensors, image signal processors, or flashes.

The power management module 188 may manage power supplied to the electronic device 101. According to one embodiment, the power management module 188 may be implemented as at least part of, For example, a power management integrated circuit (PMIC).

The battery 189 may supply power to at least one component of the electronic device 101. According to one embodiment, the battery 189 may include, For example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to one embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to one embodiment, the antenna module 197 may include an antenna including a radiating element composed of a conductive material or a conductive pattern formed in or on a substrate (e.g., a printed circuit board (PCB)). According to one embodiment, the antenna module 197 may include a plurality of antennas (e.g., array antennas). In such a case, at least one antenna appropriate for a communication scheme used in the communication network, such as the first network 198 or the second network 199, may be selected, For example, by the communication module 190 (e.g., the wireless communication module 192) from the plurality of antennas. The signal or the power may then be transmitted or received between the communication module 190 and the external electronic device via the selected at least one antenna. According to one embodiment, another component (e.g., a radio frequency integrated circuit (RFIC)) other than the radiating element may be additionally formed as part of the antenna module 197.

According to various embodiments, the antenna module 197 may form a mmWave antenna module. According to one embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one embodiment, commands or data may be transmitted or received between the electronic device 101 and the external electronic device 104 via the server 108 coupled with the second network 199. Each of the electronic device 102 or 104 may be a device of a same type as, or a different type, from the electronic device 101. According to one embodiment, all or some of operations to be executed at the electronic device 101 may be executed at one or more of the external electronic device 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The electronic device 101 may provide the outcome, with or without further processing of the outcome, as at least part of a reply to the request. To that end, a cloud computing, distributed computing, mobile edge computing (MEC), or client-server computing technology may be used, For example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to one embodiment, the external electronic device 104 or the server 108 may be included in the second network 199. The electronic device 101 may be applied to intelligent services (e.g., smart home, smart city, smart car, or healthcare) on the basis of 5G communication technology or IoT-related technology.

Figure 2:
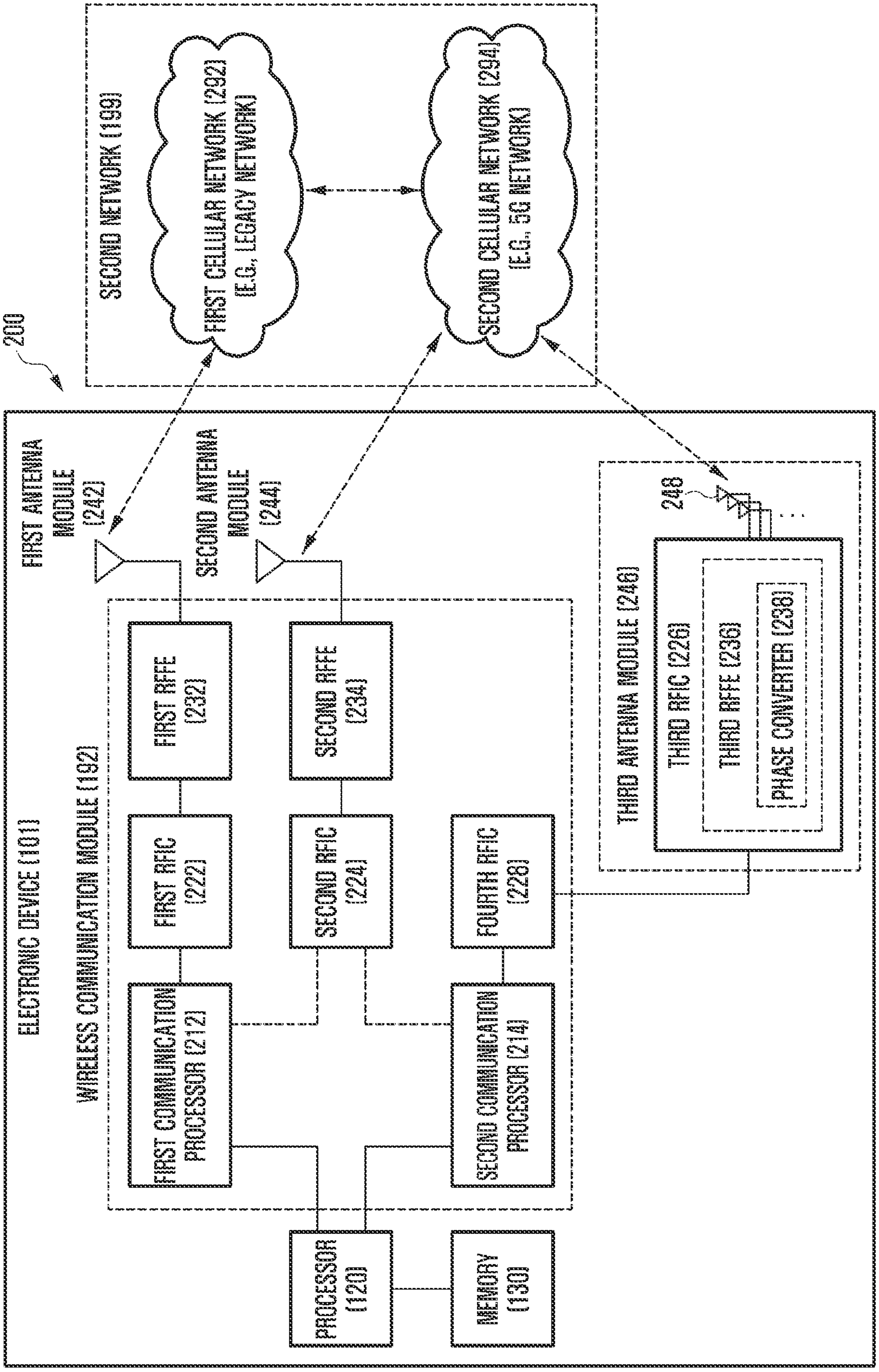
FIG. 2 is a block diagram of an electronic device for supporting legacy network communication and 5G network communication according to various embodiments of the present disclosure.

FIG. 2 is a block diagram illustrating an example configuration of an electronic device in a network environment including a plurality of cellular networks according to various embodiments.

Referring to FIG. 2, the electronic device 101 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE, 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel According to various embodiments, the first cellular network may be a legacy network including a second generation (2G), 3G, 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3A:
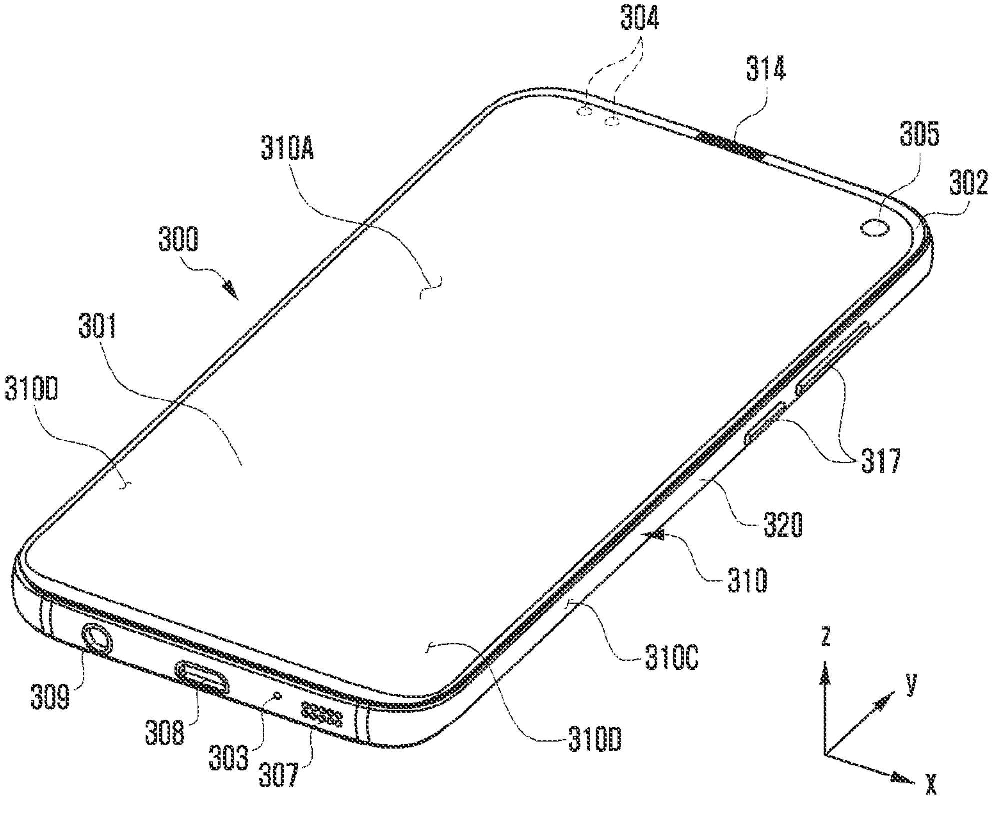
FIG. 3A is a perspective view of a mobile electronic device according to various embodiments of the present disclosure.
Figure 3B:
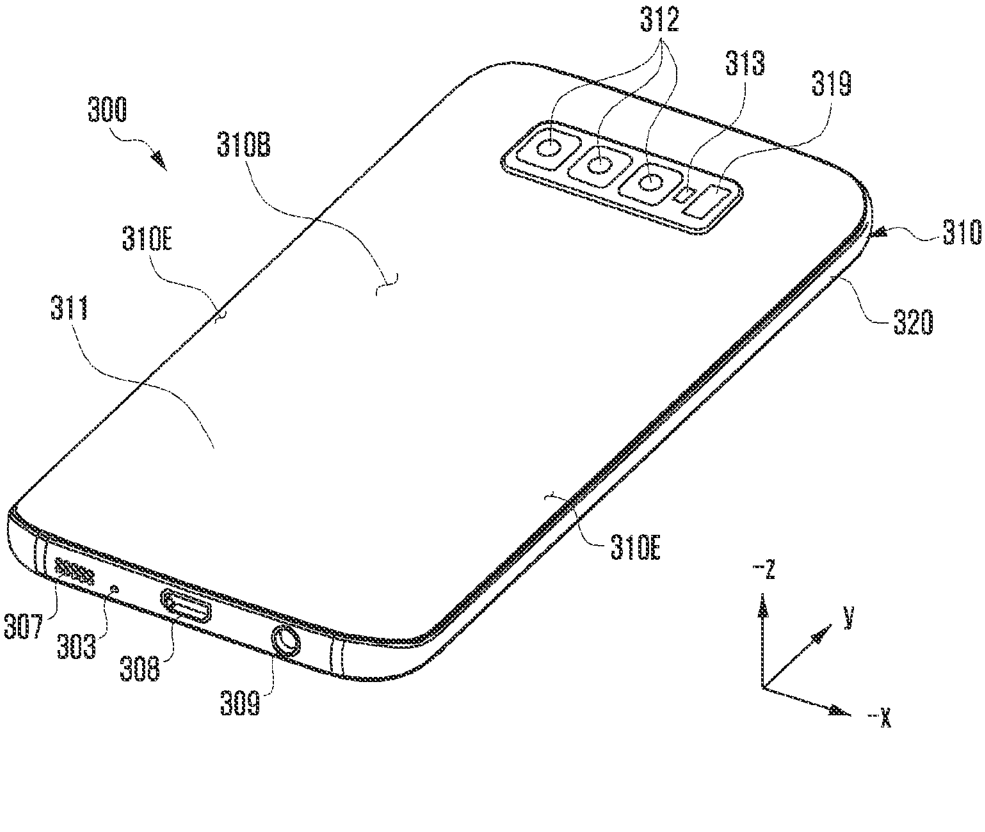
FIG. 3B is a rear perspective view of a mobile electronic device according to various embodiments of the present disclosure.

FIG. 3A illustrates a perspective view showing a front surface of a mobile electronic device according to an embodiment of the disclosure, and FIG. 3B illustrates a perspective view showing a rear surface of the mobile electronic device shown in FIG. 3A according to an embodiment of the disclosure.

The electronic device 300 in FIGS. 3A and 3B may be at least partially similar to the electronic device 101 in FIG. 1 or may further include other embodiments.

Referring to FIGS. 3A and 3B, a mobile electronic device 300 may include a housing 310 that includes a first surface (or front surface) 310A, a second surface (or rear surface) 310B, and a lateral surface 310C that surrounds a space between the first surface 310A and the second surface 310B. The housing 310 may refer to a structure that forms a part of the first surface 310A, the second surface 310B, and the lateral surface 310C. The first surface 310A may be formed of a front plate 302 (e.g., a glass plate or polymer plate coated with a variety of coating layers) at least a part of which is substantially transparent. The second surface 310B may be formed of a rear plate 311 which is substantially opaque. The rear plate 311 may be formed of, for example, coated or colored glass, ceramic, polymer, metal (e.g., aluminum, stainless steel (STS), or magnesium), or any combination thereof. The lateral surface 310C may be formed of a lateral bezel structure (or "lateral member") 318 which is combined with the front plate 302 and the rear plate 311 and includes a metal and/or polymer. The rear plate 311 and the lateral bezel structure 318 may be integrally formed and may be of the same material (e.g., a metallic material such as aluminum).

The front plate 302 may include two first regions 310D disposed at long edges thereof, respectively, and bent and extended seamlessly from the first surface 310A toward the rear plate 311. Similarly, the rear plate 311 may include two second regions 310E disposed at long edges thereof, respectively, and bent and extended seamlessly from the second surface 310B toward the front plate 302. The front plate 302 (or the rear plate 311) may include only one of the first regions 310D (or of the second regions 310E). The first regions 310D or the second regions 310E may be omitted in part. When viewed from a lateral side of the mobile electronic device 300, the lateral bezel structure 318 may have a first thickness (or width) on a lateral side where the first region 310D or the second region 310E is not included, and may have a second thickness, being less than the first thickness, on another lateral side where the first region 310D or the second region 310E is included.

The mobile electronic device 300 may include at least one of a display 301, audio modules 303, 307 and 314, sensor modules 304 and 319, camera modules 305, 312 and 313, a key input device 317, a light emitting device, and connector holes 308 and 309. The mobile electronic device 300 may omit at least one (e.g., the key input device 317 or the light emitting device) of the above components, or may further include other components.

The display 301 may be exposed through a substantial portion of the front plate 302, for example. At least a part of the display 301 may be exposed through the front plate 302 that forms the first surface 310A and the first region 310D of the lateral surface 310C. Outlines (i.e., edges and corners) of the display 301 may have substantially the same form as those of the front plate 302. The spacing between the outline of the display 301 and the outline of the front plate 302 may be substantially unchanged in order to enlarge the exposed area of the display 301. A recess or opening may be formed in a portion of a display area of the display 301 to accommodate at least one of the audio module 314, the sensor module 304, the camera module 305, and the light emitting device. At least one of the audio module 314, the sensor module 304, the camera module 305, a fingerprint sensor (not shown), and the light emitting element may be disposed on the back of the display area of the display 301. The display 301 may be combined with, or adjacent to, a touch sensing circuit, a pressure sensor capable of measuring the touch strength (pressure), and/or a digitizer for detecting a stylus pen. At least a part of the sensor modules 304 and 319 and/or at least a part of the key input device 317 may be disposed in the first region 310D and/or the second region 310E.

The input module (303) may include microphone (303). The microphone hole 303 may contain a microphone disposed therein for acquiring external sounds and, in a case, contain a plurality of microphones to sense a sound direction. The speaker holes 307 and 314 may be classified into an external speaker hole 307 and a call speaker hole 314. The microphone hole 303 and the speaker holes 307 and 314 may be implemented as a single hole, or a speaker (e.g., a piezo speaker) may be provided without the speaker holes 307 and 314.

The sensor modules 304 and 319 may generate electrical signals or data corresponding to an internal operating state of the mobile electronic device 300 or to an external environmental condition. The sensor modules 304 and 319 may include a first sensor module 304 (e.g., a proximity sensor) and/or a second sensor module (e.g., a fingerprint sensor) disposed on the first surface 310A of the housing 310, and/or a third sensor module 319 (e.g., a heart rate monitor (HRM) sensor) and/or a fourth sensor module (e.g., a fingerprint sensor) disposed on the second surface 310B of the housing 310. The fingerprint sensor may be disposed on the second surface 310B as well as the first surface 310A (e.g., the display 301) of the housing 310. The electronic device 300 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 305, 312 and 313 may include a first camera device 305 disposed on the first surface 310A of the electronic device 300, and a second camera module 312 and/or a flash 313 disposed on the second surface 310B. The camera module 305 or the camera module 312 may include one or more lenses, an image sensor, and/or an image signal processor. The flash 313 may include, for example, a light emitting diode or a xenon lamp. Two or more lenses (infrared cameras, wide angle and telephoto lenses) and image sensors may be disposed on one side of the electronic device 300.

The key input device 317 may be disposed on the lateral surface 310C of the housing 310. The mobile electronic device 300 may not include some or all of the key input device 317 described above, and the key input device 317 which is not included may be implemented in another form such as a soft key on the display 301. The key input device 317 may include the sensor module disposed on the second surface 310B of the housing 310.

The light emitting device may be disposed on the first surface 310A of the housing 310. For example, the light emitting device may provide status information of the electronic device 300 in an optical form. The light emitting device may provide a light source associated with the operation of the camera module 305. The light emitting device may include, for example, a light emitting diode (LED), an IR LED, or a xenon lamp.

The connector holes 308 and 309 may include a first connector hole 308 adapted for a connector (e.g., a universal serial bus (USB) connector) for transmitting and receiving power and/or data to and from an external electronic device, and/or a second connector hole 309 adapted for a connector (e.g., an earphone jack) for transmitting and receiving an audio signal to and from an external electronic device.

Some modules 305 of camera modules 305 and 312, some sensor modules 304 of sensor modules 304 and 319, or an indicator may be arranged to be exposed through a display 301. For example, the camera module 305, the sensor module 304, or the indicator may be arranged in the internal space of an electronic device 300 so as to be brought into contact with an external environment through an opening of the display 301, which is perforated up to a front plate 302. In another embodiment, some sensor modules 304 may be arranged to perform their functions without being visually exposed through the front plate 302 in the internal space of the electronic device. For example, in this case, an area of the display 301 facing the sensor module may not require a perforated opening.

Figure 3C:
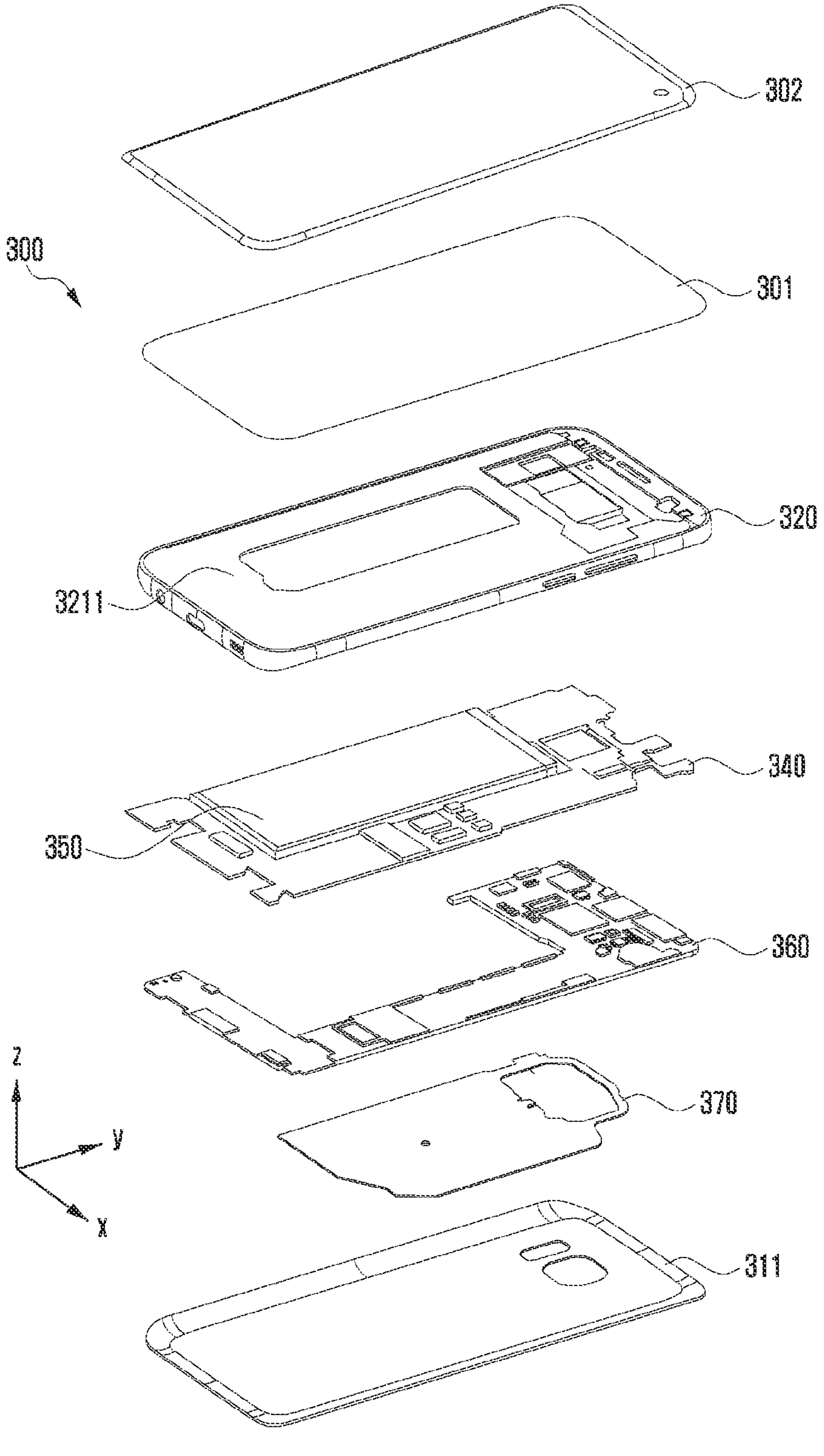
FIG. 3C is an exploded perspective view of a mobile electronic device according to various embodiments of the present disclosure.

FIG. 3C illustrates an exploded perspective view showing a mobile electronic device shown in FIG. 3A according to an embodiment of the disclosure.

Referring to FIG. 3C a mobile electronic device 300 may include a lateral bezel structure 320, a first support member 3211 (e.g., a bracket), a front plate 302, a display 301, an electromagnetic induction panel (not shown), a printed circuit board (PCB) 340, a battery 350, a second support member 360 (e.g., a rear case), an antenna 370, and a rear plate 311. The mobile electronic device 300 may omit at least one (e.g., the first support member 3211 or the second support member 360) of the above components or may further include another component. Some components of the electronic device 300 may be the same as or similar to those of the mobile electronic device 101 shown in FIG. 1 or FIG. 2, thus, descriptions thereof are omitted below.

The first support member 3211 is disposed inside the mobile electronic device 300 and may be connected to, or integrated with, the lateral bezel structure 320. The first support member 3211 may be formed of, for example, a metallic material and/or a non-metal (e.g., polymer) material. The first support member 3211 may be combined with the display 301 at one side thereof and also combined with the printed circuit board (PCB) 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, one or more of a volatile memory and a non-volatile memory.

The interface may include, for example, a high definition multimedia interface (HDMI), a USB interface, a secure digital (SD) card interface, and/or an audio interface. The interface may electrically or physically connect the mobile electronic device 300 with an external electronic device and may include a USB connector, an SD card/multimedia card (MMC) connector, or an audio connector.

The battery 350 is a device for supplying power to at least one component of the mobile electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the mobile electronic device 300, and may be detachably disposed from the mobile electronic device 300.

The antenna 370 may be disposed between the rear plate 311 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 320 and/or the first support member 3211.

Figure 4A:
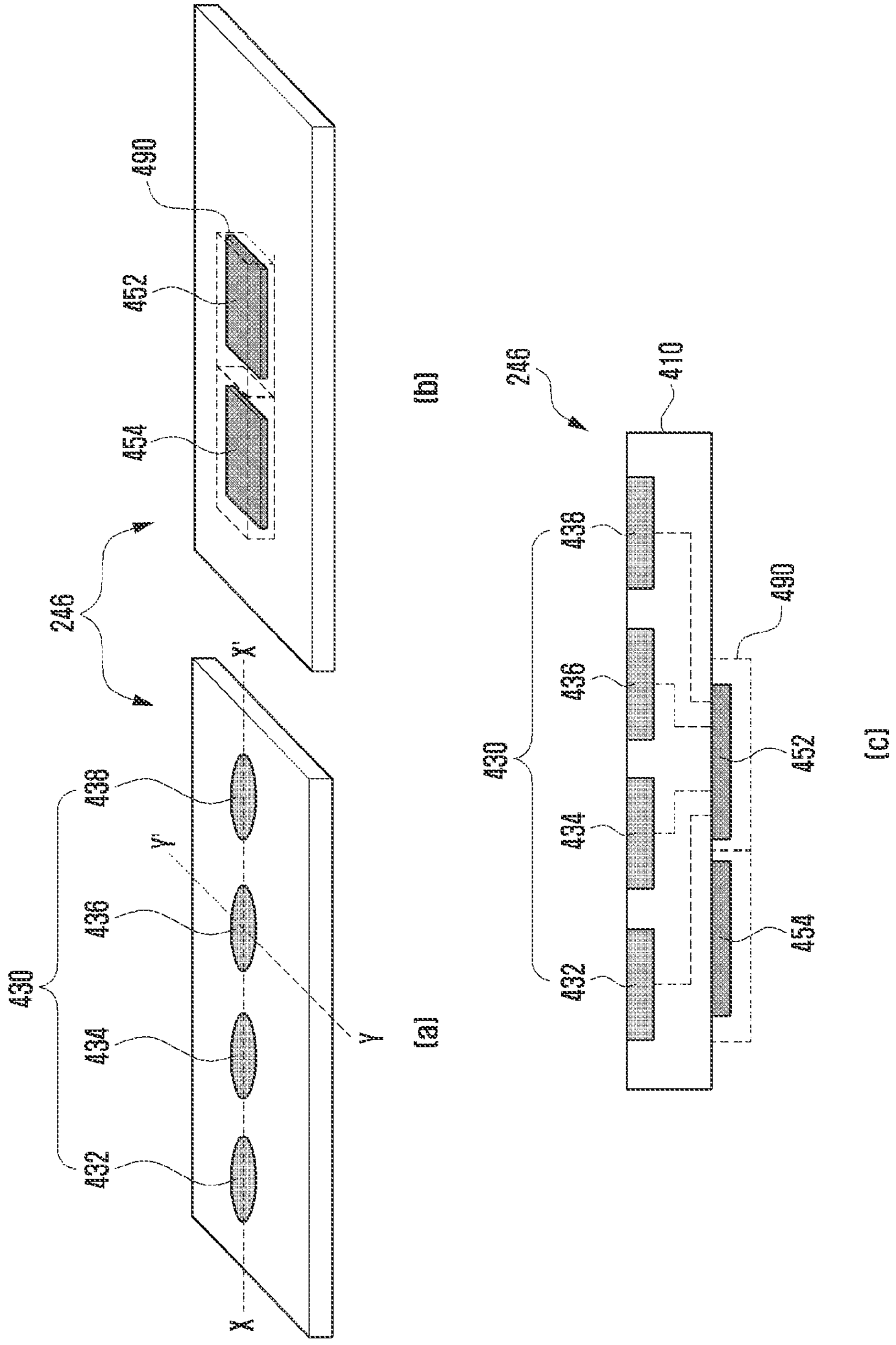
FIG. 4A illustrates an embodiment of a structure of a third antenna module described with reference to FIG. 2 according to various embodiments of the present disclosure.

FIG. 4A is diagram illustrating a structure of, for example, a third antenna module described with reference to FIG. 2 according to an embodiment of the disclosure. Part (a) of FIG. 4A is a perspective view illustrating the third antenna module 246 viewed from one side, and part (b) of FIG. 4A is a perspective view illustrating the third antenna module 246 viewed from the other side. Part (c) of FIG. 4A is a cross-sectional view illustrating the third antenna module 246 taken along line X-X' of FIG. 4A.

Referring to FIG. 4A, in one embodiment, the third antenna module 246 may include a printed circuit board 410, an antenna array 430, a RFIC 452, and a PMIC 454. Alternatively, the third antenna module 246 may further include a shield member 490. In other embodiments, at least one of the above-described components may be omitted or at least two of the components may be integrally formed.

The printed circuit board 410 may include a plurality of conductive layers and a plurality of non-conductive layers stacked alternately with the conductive layers. The printed circuit board 410 may provide electrical connections between the printed circuit board 410 and/or various electronic components disposed outside using wirings and conductive vias formed in the conductive layer.

The antenna array 430 (e.g., 248 of FIG. 2) may include a plurality of antenna elements 432, 434, 436, or 438 disposed to form a directional beam. As illustrated, the antenna elements 432, 434, 436, or 438 may be formed at a first surface of the printed circuit board 410. According to another embodiment, the antenna array 430 may be formed inside the printed circuit board 410. According to the embodiment, the antenna array 430 may include the same or a different shape or kind of a plurality of antenna arrays (e.g., dipole antenna array and/or patch antenna array).

The RFIC 452 (e.g., the third RFIC 226 of FIG. 2) may be disposed at another area (e.g., a second surface opposite to the first surface) of the printed circuit board 410 spaced apart from the antenna array. The RFIC 452 is configured to process signals of a selected frequency band transmitted/received through the antenna array 430. According to one embodiment, upon transmission, the RFIC 452 may convert a baseband signal obtained from a communication processor (not shown) to an RF signal of a designated band. Upon reception, the RFIC 452 may convert an RF signal received through the antenna array 430 to a baseband signal and transfer the baseband signal to the communication processor.

According to another embodiment, upon transmission, the RFIC 452 may up-convert an IF signal (e.g., about 9 GHz to about 11 GHz) obtained from an intermediate frequency integrate circuit (IFIC) (e.g., 228 of FIG. 2) to an RF signal of a selected band. Upon reception, the RFIC 452 may down-convert the RF signal obtained through the antenna array 430, convert the RF signal to an IF signal, and transfer the IF signal to the IFIC.

The PMIC 454 may be disposed in another partial area (e.g., the second surface) of the printed circuit board 410 spaced apart from the antenna array 430. The PMIC 454 may receive a voltage from a main PCB (not illustrated) to provide power necessary for various components (e.g., the RFIC 452) on the antenna module.

The shield member 490 may be disposed at a portion (e.g., the second surface) of the printed circuit board 410 so as to electromagnetically shield at least one of the RFIC 452 or the PMIC 454. According to one embodiment, the shield member 490 may include a shield can.

Although not shown, in various embodiments, the third antenna module 246 may be electrically connected to another printed circuit board (e.g., main circuit board) through a module interface. The module interface may include a connecting member, for example, a coaxial cable connector, board to board connector, interposer, or flexible printed circuit board (FPCB). The RFIC 452 and/or the PMIC 454 of the antenna module may be electrically connected to the printed circuit board through the connection member.

Figure 4B:
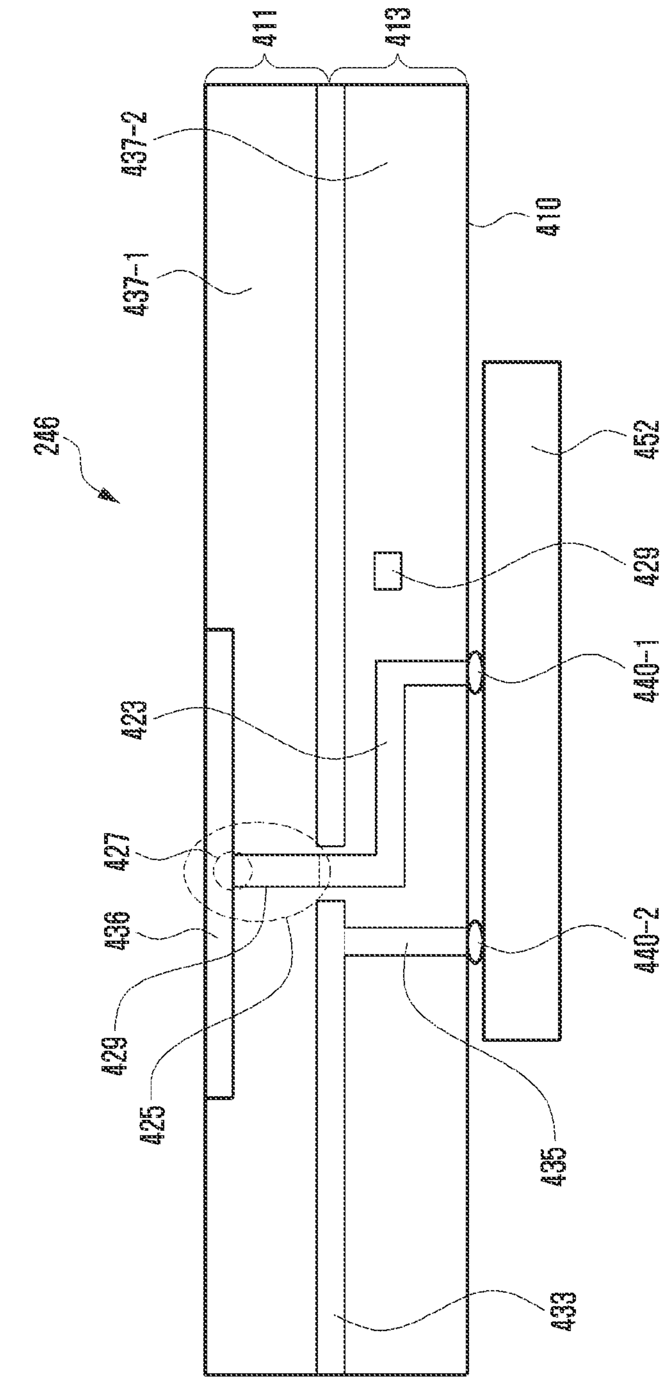
FIG. 4B illustrates a cross section along line Y-Y' of the third antenna module shown in (a) of FIG. 4A according to various embodiments of the present disclosure.

FIG. 4B is a cross-sectional view illustrating the third antenna module 246 taken along line Y-Y' of part (a) of FIG. 4A according to an embodiment of the disclosure. The printed circuit board 410 of the illustrated embodiment may include an antenna layer 411 and a network layer 413.

Referring to FIG. 4B, the antenna layer 411 may include at least one dielectric layer 437-1, and an antenna element 436 and/or a power feeding portion 425 formed on or inside an outer surface of a dielectric layer. The power feeding portion 425 may include a power feeding point 427 and/or a power feeding line 429.

The network layer 413 may include at least one dielectric layer 437-2, at least one ground layer 433, at least one conductive via 435, a transmission line 423, and/or a power feeding line 429 formed on or inside an outer surface of the dielectric layer.

Further, in the illustrated embodiment, the RFIC 452 (e.g., the third RFIC 226 of FIG. 2) of part (c) of FIG. 4A may be electrically connected to the network layer 413 through, for example, first and second solder bumps 440-1 and 440-2. In other embodiments, various connection structures (e.g., solder or ball grid array (BGA)) instead of the solder bumps may be used. The RFIC 452 may be electrically connected to the antenna element 436 through the first solder bump 440-1, the transmission line 423, and the power feeding portion 425. The RFIC 452 may also be electrically connected to the ground layer 433 through the second solder bump 440-2 and the conductive via 435. Although not illustrated, the RFIC 452 may also be electrically connected to the above-described module interface through the power feeding line 429.

Figure 5A:
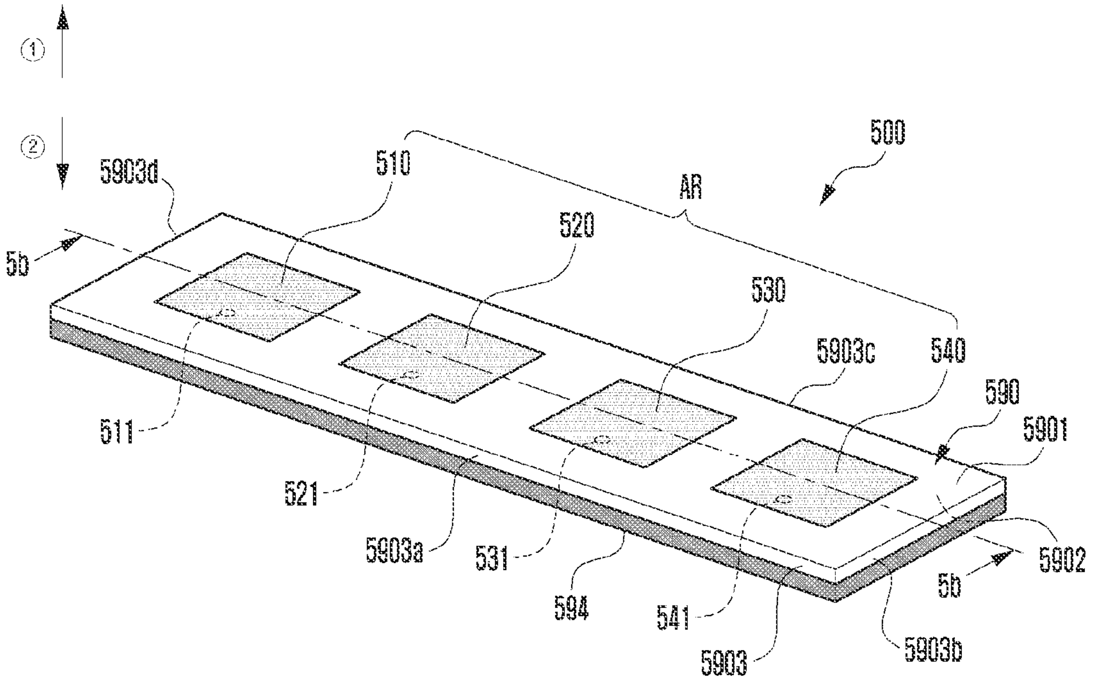
FIG. 5A is a perspective view of an antenna structure according to various embodiments of the present disclosure.
Figure 5B:
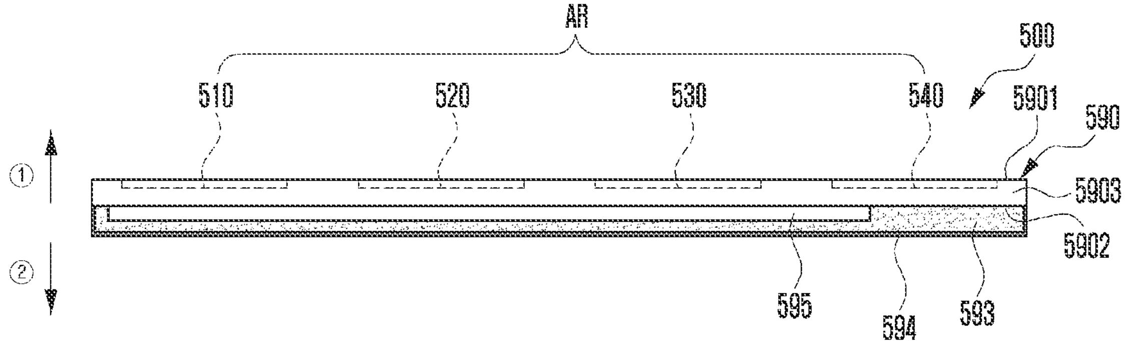
FIG. 5B is a cross-sectional view of an antenna structure viewed along line 5*b*-5*b* of FIG. 5A according to various embodiments of the present disclosure.

FIG. 5A is a perspective view of an antenna structure according to various embodiments of the present disclosure. FIG. 5B is a cross-sectional view of an antenna structure viewed along line 5*b*-5*b* of FIG. 5A according to various embodiments of the present disclosure.

The antenna structure 500 of FIGS. 5A and 5B may be at least partially similar to the third antenna module 246 of FIG. 2 or may further include other embodiments of the antenna structure.

With reference to FIGS. 5A and 5B, an antenna structure 500 (e.g., an antenna module) may include an array antenna (AR) including a plurality of conductive patches 510, 520, 530, and 540 as antenna elements. According to one embodiment, the plurality of conductive patches 510, 520, 530, and 540 may be disposed on a substrate 590 (e.g., a printed circuit board). According to one embodiment, the substrate 590 may have a first substrate surface 5901 facing a first direction (direction ①), a second substrate surface 5902 facing a second direction (direction ②) opposite to the first substrate surface 5901, and a substrate side surface 5903 surrounding a space between the first substrate surface 5901 and the second substrate surface 5902. According to one embodiment, the plurality of conductive patches 510, 520, 530, and 540 may be exposed on the first substrate surface 5901 or inserted into the substrate 590 and may be disposed to form a beam pattern toward a first direction (direction ①). According to one embodiment, the substrate side surface 5903 may include a first substrate side surface 5903*a* having a first length; a second substrate side surface 5903*b* extending perpendicularly from the first substrate side surface 5903*a* and having a second length shorter than the first length; a third substrate side surface 5903*c* extending parallel to the first substrate side surface 5903*a* from the second substrate side surface 5903*b* and having a first length; and a fourth substrate side surface 5903*d* extending parallel to a second substrate side surface 5903*b* from the third substrate side surface 5903*c* and having a second length. According to one embodiment, in the antenna structure 500, at least one of the substrate side surfaces 5903*a*, 5903*b*, 5903*c*, and 5903*d* of the substrate 590 may be disposed in an inner space (e.g., the inner space 7001 of FIG. 7B) of an electronic device (e.g., the electronic device 700 of FIG. 7B) so that it may correspond to a housing (e.g., the housing 710 of FIG. 7B).

According to various embodiments, the antenna structure 500 may include wireless communication circuit 595 disposed on the second substrate surface 5902 of the substrate 590. According to one embodiment, the plurality of conductive patches 510, 520, 530, and 540 may be electrically connected to the wireless communication circuit 595 through a wiring structure (not shown) inside the board. According to one embodiment, the wireless communication circuit 595 may be configured to transmit and/or receive radio frequencies in the range of about 3 GHz to about 100 GHz via an array antenna (AR). In some embodiments, the wireless communication circuit 595 may be disposed at a location apart from the substrate 590 in an inner space (e.g., the inner space 7001 of FIG. 7B) of an electronic device (e.g., the electronic device 700 of FIG. 7B) and may be electrically connected to the substrate 590 through an electrical connection member (e.g., FPCB). For example, the wireless communication circuit 595 may be disposed on a main board (e.g., the main board 760 of FIG. 7B) of an electronic device (e.g., the electronic device 700 of FIG. 7B).

According to various embodiments, the plurality of conductive patches 510, 520, 530, and 540 may include a first conductive patch 510 including a first power feed unit 511, a second conductive patch 520 including a second power feed unit 521, a third conductive patch 530 including a third power feed unit 531 and a fourth conductive patch 540 including a fourth power feed unit that are disposed at regular intervals in the first substrate surface 5901 of the substrate 590 or in the inner area of the substrate 590 adjacent to the first substrate surface 5901. According to one embodiment, the conductive patches 510, 520, 530, and 540 may have substantially the same shape. An antenna structure 500 according to exemplary embodiments of the present disclosure has been shown and described for an array antenna (AR) including four conductive patches 510, 520, 530, and 540, but is not limited thereto. For example, the antenna structure 500 may include one single conductive patch or may also include two or more than five conductive patches as an array antenna (AR). In some embodiments, the antenna structure 500 may further include a plurality of conductive patterns (e.g., a dipole antenna) disposed on the substrate 590. In this case, the conductive patterns may be disposed such that the beam pattern direction is formed in a different direction (e.g., a vertical direction) from the beam pattern direction of the conductive patches 510, 520, 530, and 540. In some embodiments, each of the conductive patches 510, 520, 530, and 540 may also operate as a dual polarized array antenna by including additional power feed units.

According to various embodiments, the antenna structure 500 may include a protection member 593 disposed on the second substrate surface 5902 of the substrate 590 and disposed to at least partially enclose the wireless communication circuit 595. According to one embodiment, the protection member 593 may include a dielectric that is hardened and/or solidified after being applied as a protective layer disposed to surround the wireless communication circuit 595. According to one embodiment, the protection member 593 may include an epoxy resin. According to one embodiment, the protection member 593 may be disposed to cover all or part of the wireless communication circuit 595 on the second substrate surface 5902 of the substrate 590. According to one embodiment, the antenna structure 500 may include a conductive shielding layer 594 laminated on at least a surface of the protection member 593. According to one embodiment, the conductive shielding layer 594 may shield noise generated from the antenna structure 500 (e.g., DC-DC noise or an interference frequency component) from spreading to the surroundings. According to one embodiment, the conductive shielding layer 594 may include a conductive material applied on the surface of the protection member 593 by a thin film deposition method such as sputtering. According to one embodiment, the conductive shielding layer 594 may be electrically connected to the ground of the substrate 590. In some embodiments, the conductive shielding layer 594 may be disposed to extend to at least a portion of the substrate side surface 5903 of the substrate including the protection member 593. In some embodiments, the protection member 593 and/or the conductive shielding layer 594 may also be replaced with a shield can mounted on a substrate.

Figure 6:
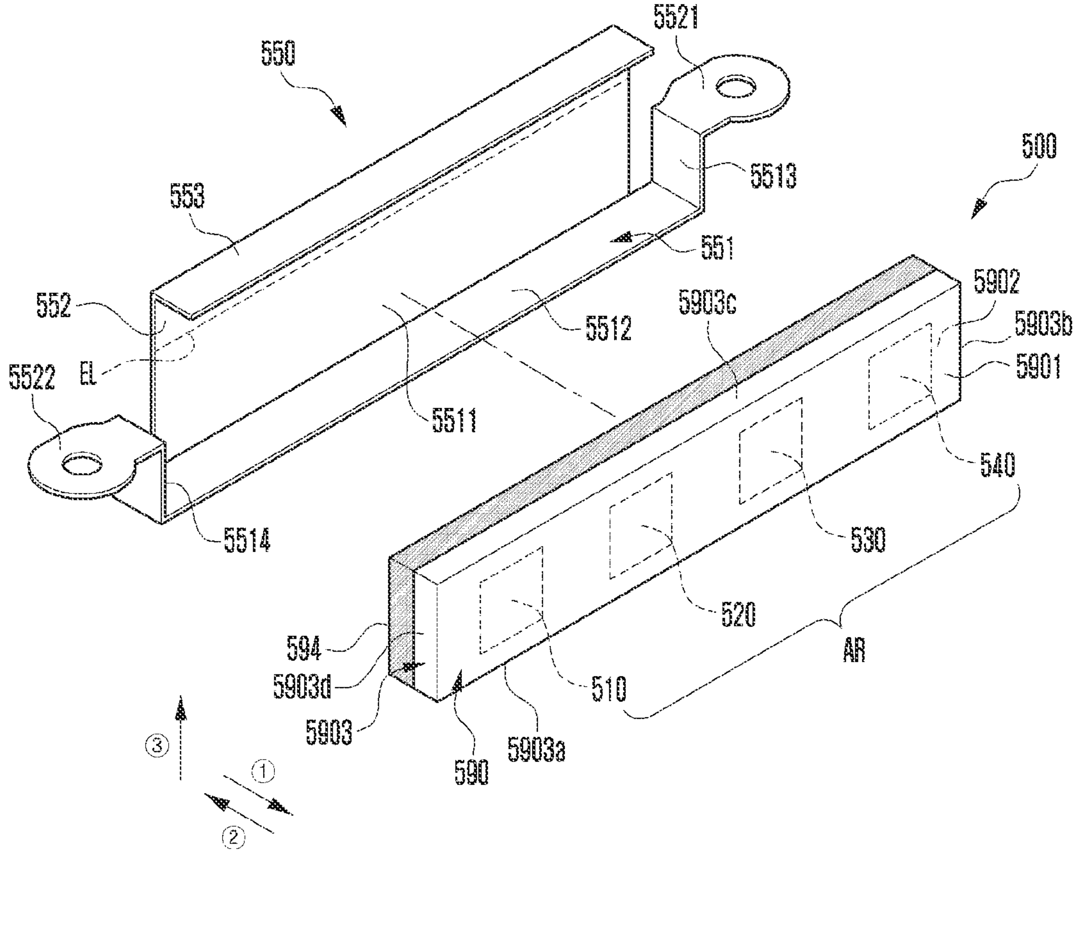
FIG. 6 is an exploded perspective view illustrating a state in which a conductive bracket is applied to an antenna structure according to various embodiments of the present disclosure.

FIG. 6 is an exploded perspective view illustrating a state in which a conductive bracket is applied to an antenna structure according to various embodiments of the present disclosure.

With reference to FIG. 6, an electronic device (e.g., the electronic device 700 of FIG. 7B) may include a conductive bracket 550 (e.g., the conductive member) fixed to a conductive member (e.g., the conductive member 721 of FIG. 7B) (e.g., the conductive portion) of the housing (e.g., the housing 710 of FIG. 7B) and an antenna structure 500 disposed to be at least partially supported through the conductive bracket 550. In some embodiments, the conductive bracket 550 may be fixed to a conductive member (e.g., the conductive member 721 of FIG. 7B) of the support member (e.g., the support member 711 of FIG. 7B) formed as a portion of the housing (e.g., the housing 710 of FIG. 7B). According to one embodiment, the conductive bracket 550 may help to reinforce the rigidity of the antenna structure 500 by being at least partially contacted with the conductive member (e.g., the conductive member 721 of FIG. 7B) of the lateral member (e.g., the lateral member 720 of FIG. 7B), and it may effectively dissipate the heat by transferring the heat generated from the antenna structure 500 to the conductive member 721 of the housing 710. Accordingly, the conductive bracket 550 may be formed of a metal material (e.g., SUS, Cu, or Al) having specified thermal conductivity and tensile strength.

Figure 7A:
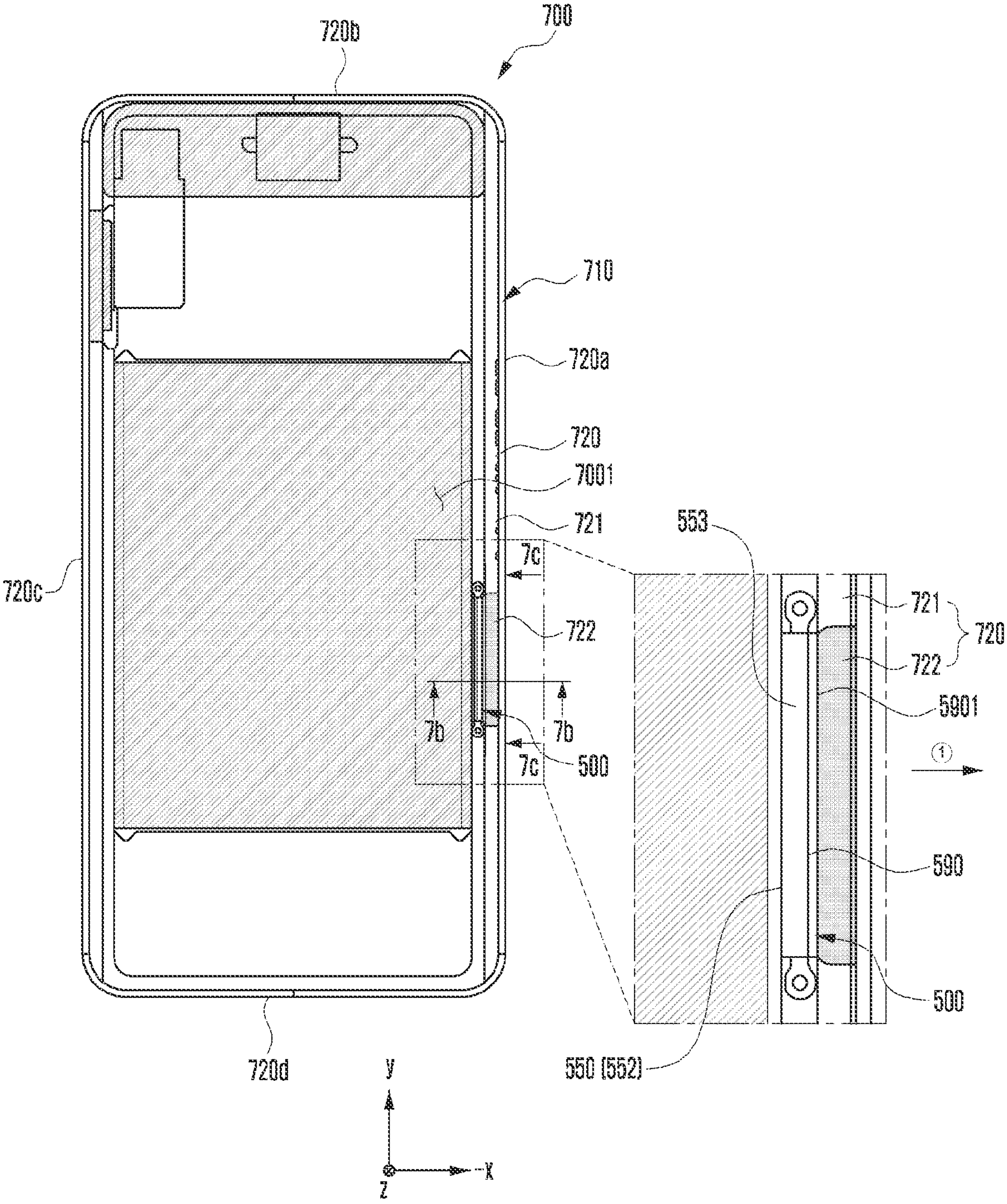
FIG. 7A is a partial configuration diagram of an electronic device showing a disposition structure of an antenna structure to which a conductive bracket is applied according to various embodiments of the present disclosure.
Figure 7B:
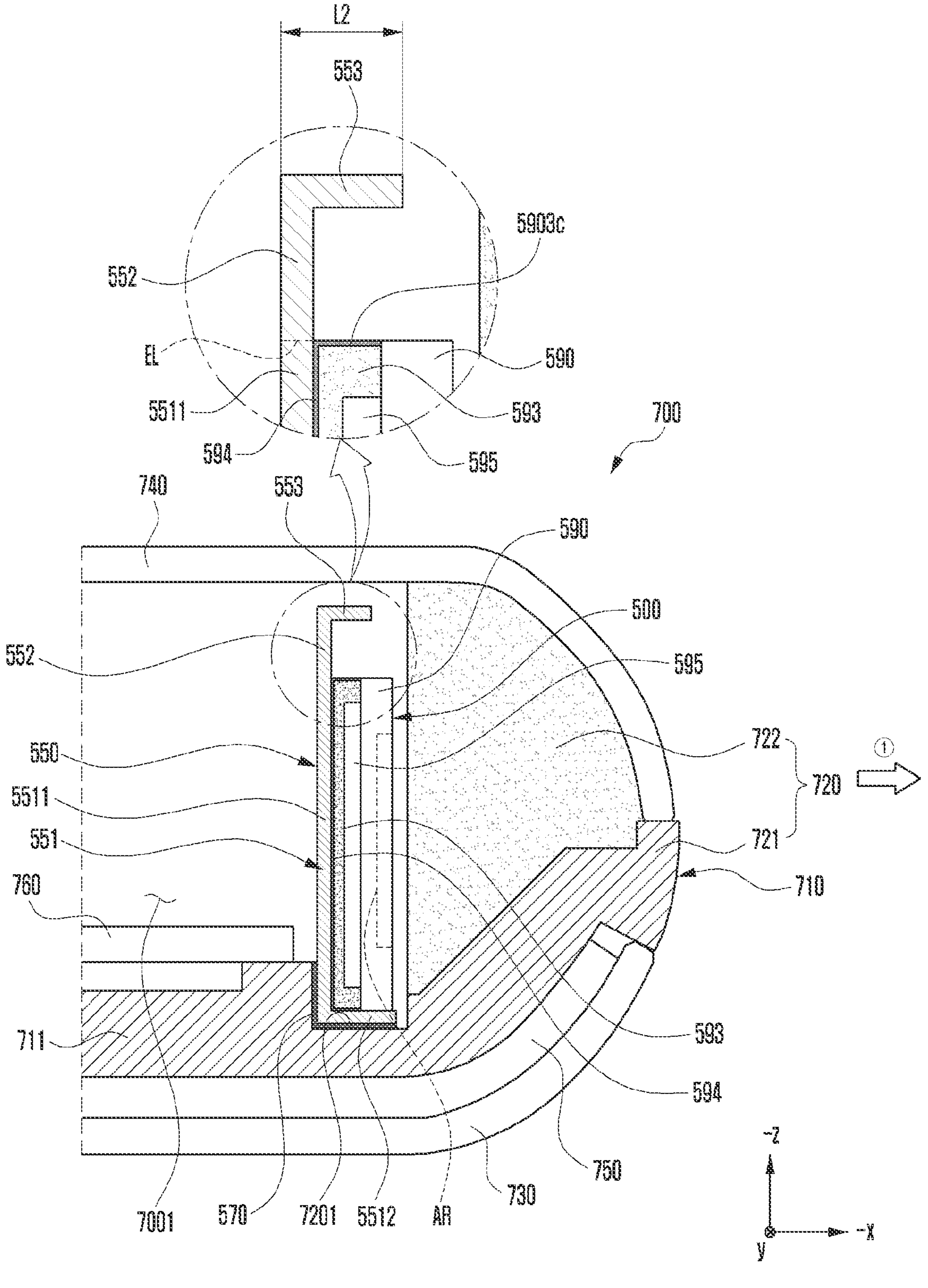
FIG. 7B is a partial cross-sectional view of an electronic device viewed along line 7*b*-7*b* of FIG. 7A according to various embodiments of the present disclosure.

According to various embodiments, the conductive bracket 550 may include a conductive plate 551 made of a metal material and at least one fixing part 5521 or 5522 extending outwards from the conductive plate 551 and to be fixed to the conductive member (e.g., the conductive member 721 of FIG. 7B) of the housing (e.g., the housing 710 of FIG. 7B). According to one embodiment, the conductive plate 551 may include a first support part 5511 correspondingly disposed to cover at least a portion of the second substrate surface 5902 of the substrate 590 (i.e., to support a rear surface of the antenna structure 500 after insertion); a second support part 5512 extending from the first support part 5511 and correspondingly disposed to cover at least a portion of the first substrate side surface 5903*a* (i.e., to support a bottommost surface of the antenna structure 500 after insertion); a third support part 5513 extending from one end of the second support part 5512 and correspondingly disposed to cover at least a part of the second substrate side surface 5903*b* (i.e., to support a side surface of the antenna structure 500 after insertion); and a fourth support part 5514 extending from the other end of the second support part 5512 and correspondingly disposed to cover at least a portion of the fourth substrate side surface 5903*d* (i.e., to support the other side of the antenna structure 500 after insertion). According to one embodiment, at least one of the fixing parts 5521 and 5522 may include a first fixing part 5521 extending outwards from the third support part 5513 and a second fixing part 5522 extending outwards from the fourth support part 5514. According to one embodiment, the first fixing part 5521 and the second fixing part 5522 may be fixed to the conductive member (e.g., the conductive member 721 of FIG. 7B) of the housing (e.g., the housing 710 of FIG. 7B) through a fastening member such as a screw (e.g., the screw S of FIG. 7C).

According to various embodiments, the conductive bracket 550 may include a conductive extension part 552 extending from the first support part 5511 in a third direction (direction ③) perpendicular to the first direction (direction ①). According to one embodiment, when the first substrate surface 5901 is viewed from above, the conductive extension part 552 may extend outwards from the substrate 590 to have a specified length (e.g., protrusion amount). According to one embodiment, when the second substrate surface 5902 of the substrate 590 is coupled to face the first support part 5511 of the conductive bracket 550, the conductive extension part 552 may be extended longer than the virtual line EL coincident with the third substrate side surface 5903*c* by a specified length in the third direction (direction ③). According to one embodiment, the conductive bracket 550 may include a bent part 553 that is bent from the end of the conductive extension part 552 by a specified bending amount in a substrate direction (e.g., a first direction (direction ①)). According to one embodiment, the bent part 553 may be extended to have a bending length that at least partially overlaps with the third substrate side surface 5903*c* when viewed from above. In some embodiments, the bent part 553 includes a bending length that fully overlaps the third substrate side surface 5903*c* when viewed from above (after insertion of the antenna structure 500). In some embodiments, the bent part 553 includes a bending length that extends beyond the third substrate side surface 5903*c* when viewed from above (after insertion of the antenna structure 500). In one embodiment, a bent part 553 may be bent at right angle from the conductive extension part 552. In some embodiments, the bent part 553 may be bent from the conductive extension part 552 at a non-perpendicular angle, for example, at an acute or obtuse angle. In some embodiments, a conductive extension part 552 and/or a bent part 553 may be replaced with a conductive structure disposed in proximity or in contact with the conductive bracket 550 in an inner space (e.g., the inner space 7001 of FIG. 7B) of an electronic device (e.g., the electronic device 700 of FIG. 7B). For example, the conductive structure may be formed through a change in the structural shape of a conductive member (e.g., the conductive member 721 of FIG. 7B) of a lateral member (e.g., the lateral member 720 of FIG. 7B) formed of at least a part of a housing (e.g., the housing 710 of FIG. 7B). In some embodiments, the conductive structure may be replaced with at least a part of a conductive shield can disposed in the inner space 7001 of the electronic device 700.

According to exemplary embodiments of the present disclosure, at least a portion of the radiation current radiated from the array antenna AR of the antenna structure 500 may help to improve radiation performance (e.g., gain) to the front surface direction (e.g., the first direction (direction ①)) of the array antenna AR by the phenomenon of being abandoned to the rear surface direction (e.g., the second direction (direction ②)) of the substrate 590 through the conductive extension part 552 being reduced and induced to the front direction (e.g., the first direction (direction ①)).

Hereinafter, the disposition relationship between the conductive bracket 550 and the electronic device 700 will be described in detail.

Figure 7C:
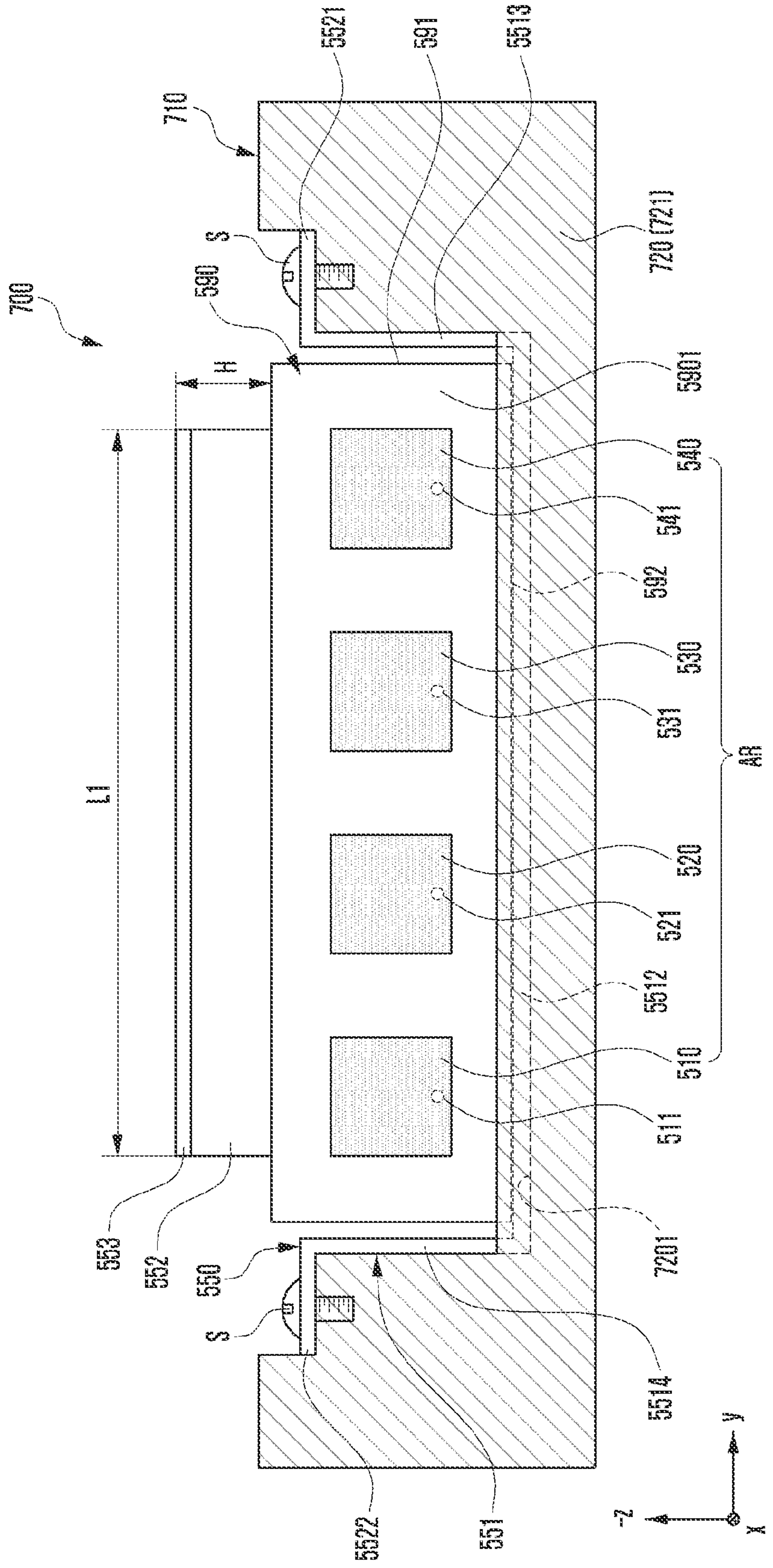
FIG. 7C is a partial cross-sectional view of an electronic device viewed along line 7*c*-7*c* of FIG. 7A according to various embodiments of the present disclosure.

FIG. 7A is a partial configuration diagram of an electronic device showing a disposition structure of an antenna structure to which a conductive bracket is applied according to various embodiments of the present disclosure. FIG. 7B is a partial cross-sectional view of an electronic device viewed along line 7b-7b of FIG. 7A according to various embodiments of the present disclosure. FIG. 7C is a partial cross-sectional view of an electronic device viewed along line 7c-7c of FIG. 7A according to various embodiments of the present disclosure.

The electronic device 700 of FIGS. 7A to 7C may be at least partially similar to the electronic device 101 of FIG. 1 or the electronic device 300 of FIGS. 3A to 3C, or may further include other embodiments of the electronic device.

With reference to FIGS. 7A to 7C, the electronic device 700 may include a front surface plate 730 (e.g., the front plate 302 of FIG. 3A) facing a first direction (e.g., the z-axis direction), a rear surface plate 740 (e.g., the rear plate 311 of FIG. 3B) facing a second direction opposite to the first direction (e.g., the −z axis direction), and a housing 710 (e.g., the housing 310 of FIG. 3A) including a lateral member 720 (e.g., the lateral bezel structure 320 of FIG. 3A) surrounding the inner space 7001 between the front surface plate 730 and the rear surface plate 740. According to one embodiment, the lateral member 720 may include a first side surface 720*a* having a first length formed in a designated direction (e.g., the y-axis direction), a second side surface 720*b* extending in a substantially perpendicular direction (e.g., the x-axis direction) from the first side surface 720*a* and having a second length shorter than the first length, a third side surface 720*c* extending substantially parallel to the first side surface 720*a* from the second side surface 720*b* and having the first length, and a fourth side surface 720*d* extending substantially parallel to the second side surface 720*b* from the third side surface 720*c* to the first side surface 720*a* and having the second length. According to one embodiment, the lateral member 720 may include a conductive member 721 and a non-conductive member 722 (e.g., a polymer portion) insert-injected into the conductive member 721. In some embodiments, the non-conductive member 722 may be replaced with a space or other dielectric material. In some embodiments, non-conductive member 722 may be structurally coupled to conductive member 721.

According to one embodiment, the lateral member 720 may include a support member 711 (e.g., the first support member 3211 of FIG. 3C) extending from the lateral member 720 to at least a portion of the inner space 7001. According to one embodiment, the support member 711 may extend from the lateral member 720 into the inner space 7001 or may be formed by structural coupling with the lateral member 720. According to one embodiment, the support member 711 may extend from the conductive member 721. According to one embodiment, the support member 711 may support at least a portion of the antenna structure 500 disposed in the inner space 7001. According to one embodiment, the support member 711 may be disposed to support at least a portion of the display 750. According to one embodiment, the display 750 may be disposed to be visible from the outside through at least a portion of the front surface plate 730.

According to various embodiments, the antenna structure 500 may be disposed so that an array antenna (AR), that includes a substrate 590 and conductive patches (e.g., the conductive patches 510, 520, 530, and 540 of FIG. 5A) disposed on the substrate 590, may be disposed to form a beam pattern substantially in a first direction (direction ①) toward which the lateral member 720 faces. According to one embodiment, the substrate 590 may have a short side 591 (e.g., a second substrate side surface 5903*b* and a fourth substrate side surface 5903*d*) and a long side 592 (e.g., the first substrate side surface 5903*a* and the third substrate side surface 5903*c*) extending in a direction perpendicular to the short side 591, and the plurality of conductive patches (e.g., the conductive patches 510, 520, 530, and 540 of FIG. 5A) may be disposed to have a specified interval along a direction parallel to the long side 592.

According to one embodiment, the beam pattern of the antenna structure 500 may be formed through the non-conductive member 722 of the lateral member 720. In some embodiments, antenna structure 500 may be replaced with a plurality of antenna structures having substantially the same structure. According to one embodiment, the plurality of antenna structures may be disposed so that a beam pattern may be formed in a direction toward which at least one side of the first side surface 720*a*, the second side surface 720*b*, the third side surface 720*c*, and/or the fourth side surface 720*d* faces. In some embodiments, the antenna structures may be disposed so that a beam pattern may be formed in a direction toward which the rear surface plate 740 faces. According to one embodiment, the antenna structure 500 may be disposed so that the first substrate surface 5901 of the substrate 590 may correspond to the lateral member 720. According to one embodiment, the antenna structure 500 may be disposed to face the lateral member 720 through a lateral member 720 and/or a conductive bracket 550 disposed on a module mounting portion 7201 provided through at least a portion of the lateral member 720 and the support member 711. In some embodiments, the antenna structure 500 may be disposed substantially perpendicular to the front surface plate 730 so that the first substrate surface 5901 of the substrate 590 may correspond to the lateral member 720, and a beam pattern may be formed toward the first direction (direction ①), the space between the lateral member 720 and the front surface plate 730, the direction which the front surface plate 730 faces, the space between the lateral member 720 and the rear surface plate 740, and/or the direction which the rear surface plate 740 faces. According to one embodiment, the electronic device 700 may include a main board 760 disposed in the inner space 7001. Although not shown, the antenna structure 500 may be electrically connected to the main board 760 through an electrical connection member (e.g., FPCB connector).

According to various embodiments, the electronic device 700 may include a conductive bracket 550 that supports at least a portion of the antenna structure 500 and is disposed on the module mounting portion 7201 formed through the conductive member 721 of the housing 710. According to one embodiment, the conductive bracket 550 may be fixed to at least a portion of the lateral member 720 through a fastening member such as a screw S. For example, the conductive bracket 550 may support the substrate 590 in such a way that at least a portion of the second substrate surface 5902 is supported by the first support part 5511, and at least a portion of the first substrate side surface (e.g., the first substrate side surface 5903*a* of FIG. 6) is supported by the second support part 5512. Additionally, the conductive bracket 550 may be disposed in such a sway that at least a portion of the second substrate side surface (e.g., the second substrate side surface 5903*b* of FIG. 6) is supported by a third support part (e.g., the third support part of FIG. 6) of the conductive bracket 550 5513, and at least a portion of the fourth substrate side surface (e.g., the fourth substrate side surface 5903*d* of FIG. 6) is supported by the fourth support part (e.g., the fourth support part 5514 of FIG. 6). According to one embodiment, the electronic device 700 may further include a heat conductive member 570 disposed between the conductive bracket 550 and the conductive member 721 of the lateral member 720. According to one embodiment, the heat conductive member 570 may include a thermal interface material (TIM) and may induce effective heat diffusion by transferring the heat transferred from the antenna structure 500 to the conductive bracket 550 to the conductive member 721 of the lateral member 720 and/or the support member 711.

According to various embodiments, the conductive bracket 550 may include a conductive extension part 552 extending from the first support part 5511 and a bent part 553 bent in a substrate direction (e.g., direction ①) from a conductive extension part 552. According to one embodiment, the conductive extension part 552 may be disposed to have a length along a direction parallel to the long side 592 of the substrate 590. For example, the length L1 of the conductive extension part 552 may be disposed to have substantially the same length as the disposition length of the plurality of conductive patches (e.g., the conductive patches 510, 520, 530, and 540 of FIG. 5A). In some embodiments, the length L1 of the conductive extension part 552 may be formed to be at least longer than the disposition length of the plurality of conductive patches (e.g., the conductive patches 510, 520, 530, and 540 of FIG. 5A). According to one embodiment, when viewing the first substrate surface 5901 from the front, the conductive extension part 552 may be extended to have a designated height H in a more upper direction than a virtual line EL coincident with the third substrate side surface 5903*c*. According to one embodiment, the bent part 553 may be bent from an end of the conductive extension part 552 to have a designated bending length L2. According to one embodiment, the sum of the extension height H of the conductive extension part 552 and the bending length L2 of the bent part 553 may have a length ranging from 0 to λ/2, where λ is based on a designated frequency band (e.g., about 28 GHz band) of the array antenna (AR). For example, the sum of the extension height H of the conductive extension part 552 and the bending length L2 of the bent part 553 may be λ/4. In some embodiments, the conductive bracket 550 may include only the conductive extension part 552 with the bent part 553 omitted.

According to various embodiments, the radiation performance of the array antenna AR may be determined according to the bending length L2 of the conductive extension part 552. For example, as shown in Table 1 below, it may be seen that the radiation performance of an array antenna (AR), that is supported through a conductive bracket that does not include a conductive extension part 552 and a bent part 553 and operates in a band of about 28 GHz, is substantially improved in all cases as the gain of about 6.82 dB, about 7.09 dB, and about 6.53 dB respectively is expressed in the case that the extension height H is maintained at 1.3 mm and the modified conductive extension part 552 and/or the bent part 553 are applied when the sum of the extension height H of the extension part 552 and/or the bending length L2 of the bent part 553 is 0.12λλ(e.g., when the bent part 553 does not exist), 0.25λ (e.g., when the bending length L2 of the bent part 553 is about 1.4 mm) and 0.35λ (e.g., when the bending length L2 of the bent part 553 is about 2.4 mm), while a gain of about 6.52 dB is expressed in the cumulative distribution function (CDF) 50% section. In addition, it may be seen that the most excellent radiation performance of the array antenna (AR) is expressed as a gain of 7.09 dB when the sum of the extension height H of the extension part 552 of the conductive bracket 550 and the bending length L2 of the bent part 553 is λ/4.

TABLE 1

| mmwave simulation (높이(H) = 1.3 mm) | n261(28 GHz) | |
|---|---|---|
| default | peak | 11.08 |
| | CDF50 | 6.52 |
| L2 = 0.12λ | peak | 10.94 |
| | CDF50 | 6.82 |
| L2 = 0.25λ | peak | 10.95 |
| | CDF50 | 7.09 |
| L2 = 0.35λ | peak | 10.83 |
| | CDF50 | 6.53 |

According to various embodiments, the radiation performance of the array antenna AR may be determined according to the extension height H of the conductive extension part 552. For example, as shown in Table 2 below, it may be seen that the radiation performance of an array antenna (AR), that is supported through a conductive bracket that does not include a conductive extension part 552 and a bent part 553 and operates in a band of about 28 GHz, is substantially improved in all cases as the gain of about 6.86 dB, about 7.09 dB, and about 6.67 dB respectively is expressed in the case that the bending length L2 is maintained at 1.4 mm and the modified conductive extension part 552 and the bent part 553 are applied when the sum of the extension height H of the extension part 552 and/or the bending length L2 of the bent part 553 is 0.18λ (e.g., when the extension height H of the extension 552 is about 0.5 mm), 0.25λ (e.g., when the extension height H of the extension 552 is about 1.3 mm) and 0.35λ (e.g., when the extension height H of the extension 552 is about 2.3 mm), while a gain of about 6.52 dB is expressed in the cumulative distribution function (CDF) 50% section. In addition, it may be seen that the most excellent radiation performance of the array antenna (AR) is expressed as a gain of 7.09 dB is expressed in the case that the sum of the extension height H of the extension part 552 of the conductive bracket 550 and the bending length L2 of the bent part 553 is λ/4.

TABLE 2

| mmwave simulation (절곡길이(L2) = 1.4 mm) | n261(28 GHz) | |
|---|---|---|
| default | peak | 11.08 |
| | CDF50 | 6.52 |
| L2 = 0.18λ | peak | 10.79 |
| | CDF50 | 6.86 |
| L2 = 0.25λ | peak | 10.95 |
| | CDF50 | 7.09 |
| L2 = 0.35λ | peak | 11.21 |
| | CDF50 | 6.67 |

In some embodiments, the extension height H of the extension part 552 may have a length ranging from 0 to λ/2 (e.g., length of λ/4) based on a designated frequency band (e.g., about 28 GHz band) of the array antenna (AR). In some embodiments, the bending length L2 of the bent part 553 may also have a length ranging from 0 to λ/2 (e.g., length of λ/4) based on a designated frequency band (e.g., about 28 GHz band) of the array antenna AR.

The conductive extension part 552 and the bent part 553 according to exemplary embodiments of the present disclosure may help to improve the forward direction radiation performance of the array antenna (AR) by reflecting in the forward direction the radiation current (surface wave) propagated from the array antenna AR to the rear direction of the substrate 590.

Figure 8A:
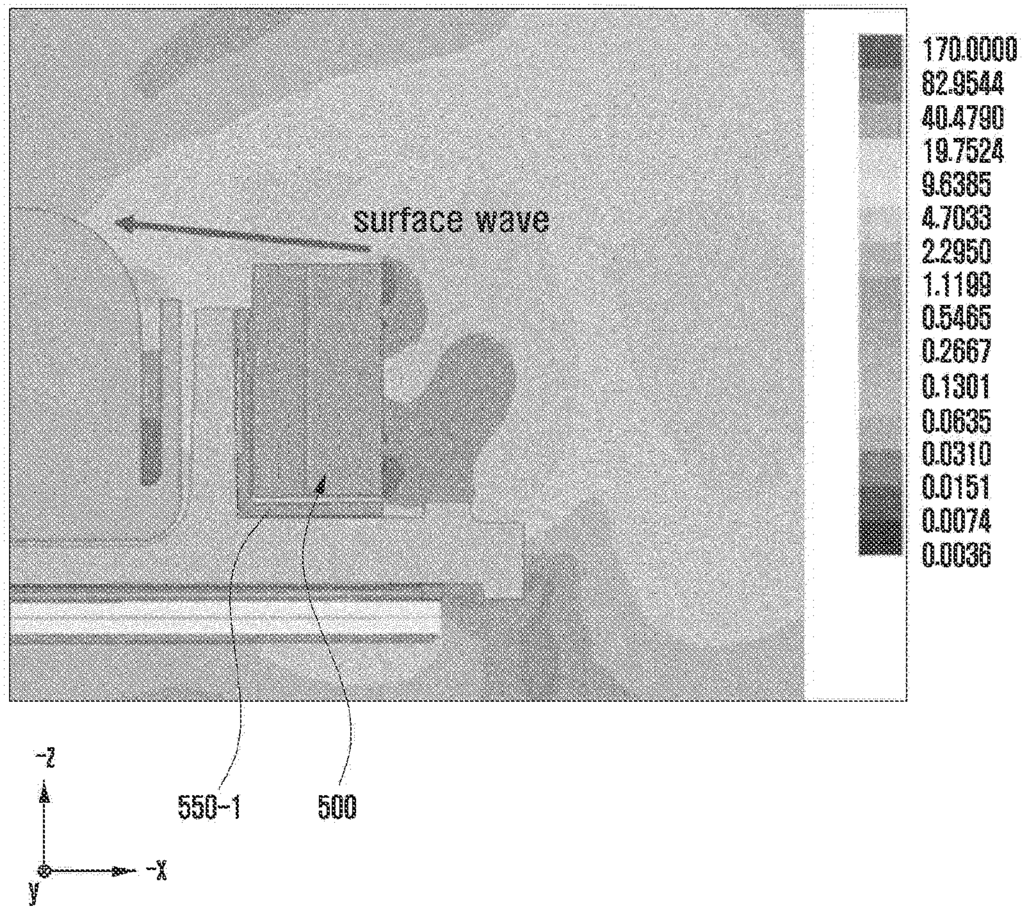
FIGS. 8A and 8B are views comparing current distributions excited in a conductive bracket with and without a conductive extension part according to various embodiments of the present disclosure.
Figure 8B:
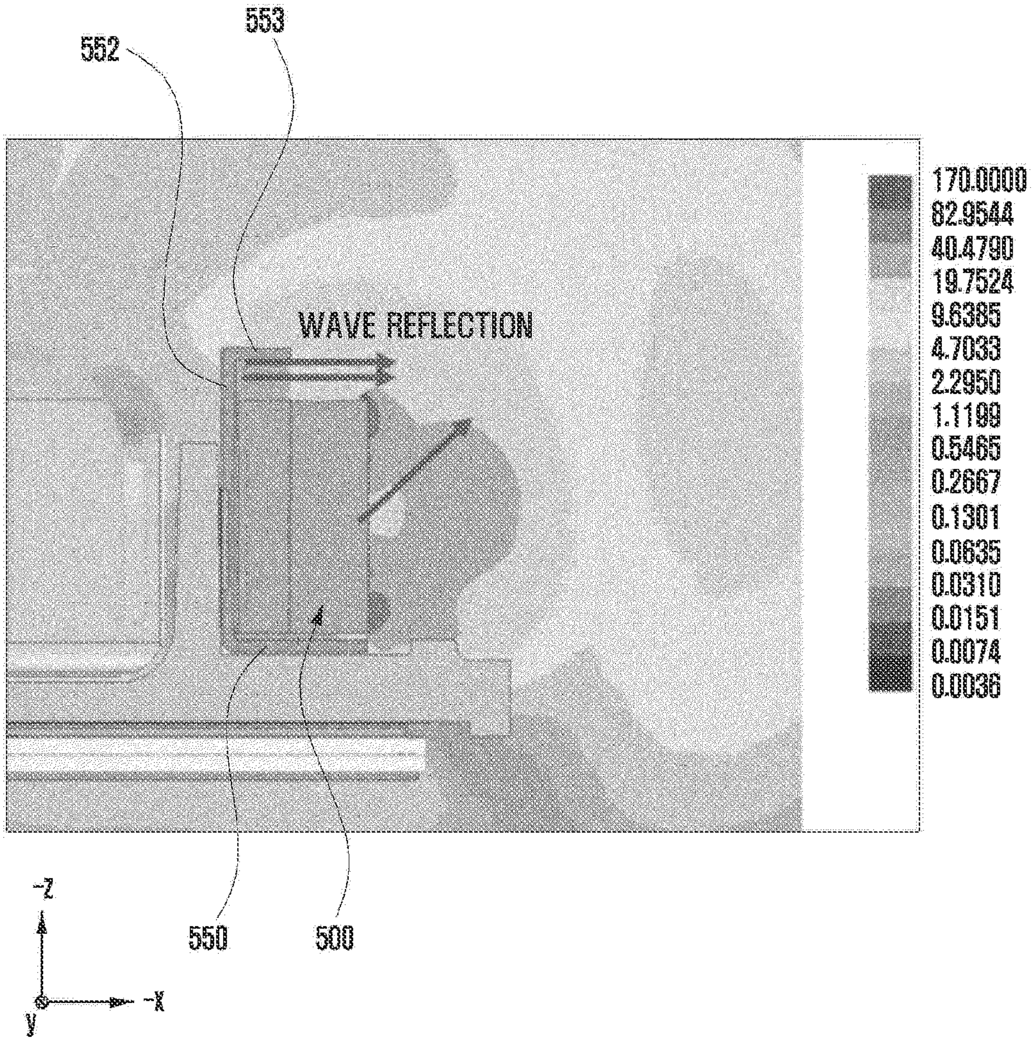

FIGS. 8A and 8B are views comparing current distributions excited in a conductive bracket with and without a conductive extension part according to various embodiments of the present disclosure.

With reference to FIG. 8A, it may be seen that a portion of radiation current radiated from the antenna structure 500 disposed in the inner space 7001 of the electronic device 700 through the conductive bracket 550-1 in which the conductive extension part 552 does not exist is abandoned to the rear direction of the antenna structure 500. Because of this abandoned current, the radiation performance may be deteriorated as the gain of the antenna structure 500 in the forward direction is reduced.

With reference to FIG. 8B, it may be seen that the radiation current abandoned to the rear direction of the antenna structure 500 disposed in the inner space of the electronic device 700 by the conductive bracket 550 according to an exemplary embodiment of the present disclosure is reflected in the forward direction of the antenna structure 500 through the conductive extension part 552 and the bent part 553. Through this radiation current reflection structure, the gain of the antenna structure 500 in the forward direction may be increased and radiation performance may be improved.

Figure 9:
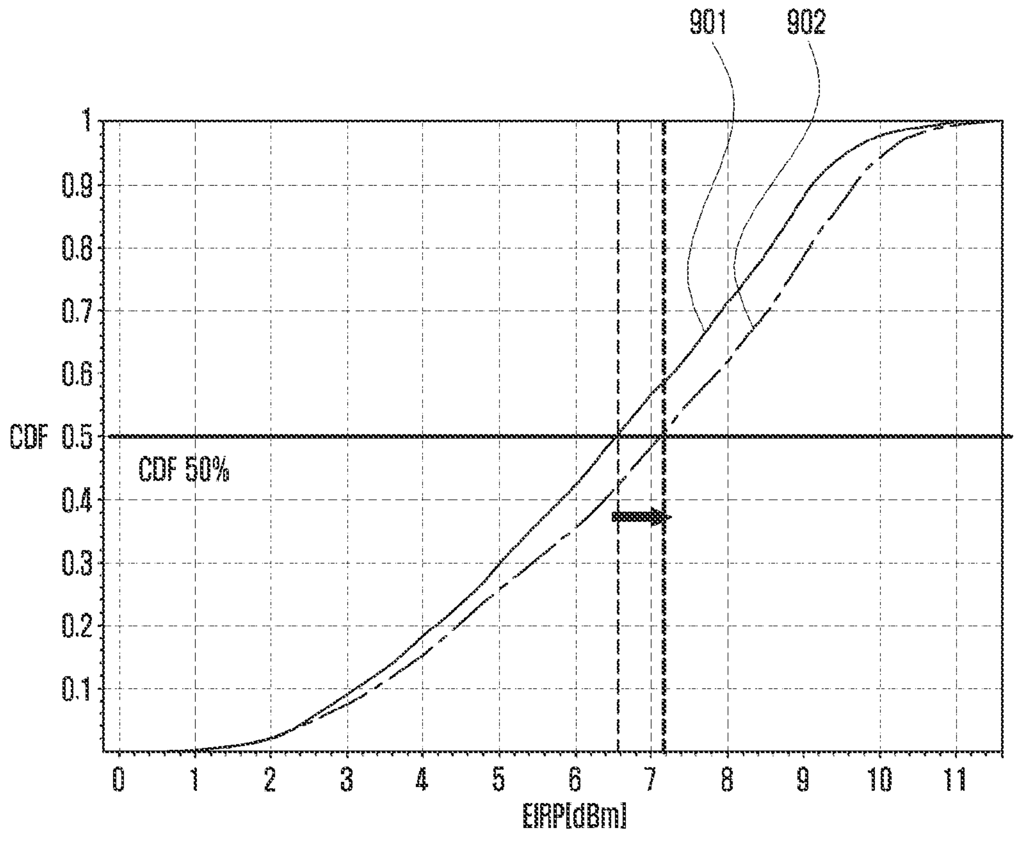
FIG. 9 is a graph comparing radiation performance of antenna structures with and without a conductive extension part according to various embodiments of the present disclosure.

FIG. 9 is a graph comparing radiation performance of antenna structures with and without a conductive extension part according to various embodiments of the present disclosure.

With reference to FIG. 9, it may be seen that the gain of 0.6 dB is substantially improved as the radiation performance of the antenna structure 500 supported through the conductive bracket (e.g., the conductive bracket 550-1 of FIG. 8A) not including the conductive extension part 552 and the bent part 553 is expressing a gain of about 6.6 dB (graph 901) in the cumulative distribution function (CDF) 50% section, while the radiation performance of the antenna structure 500 supported through the conductive bracket 550 including the conductive extension part 552 and the bent part 553 is expressing a gain of about 7.2 dB.

Figure 10A:
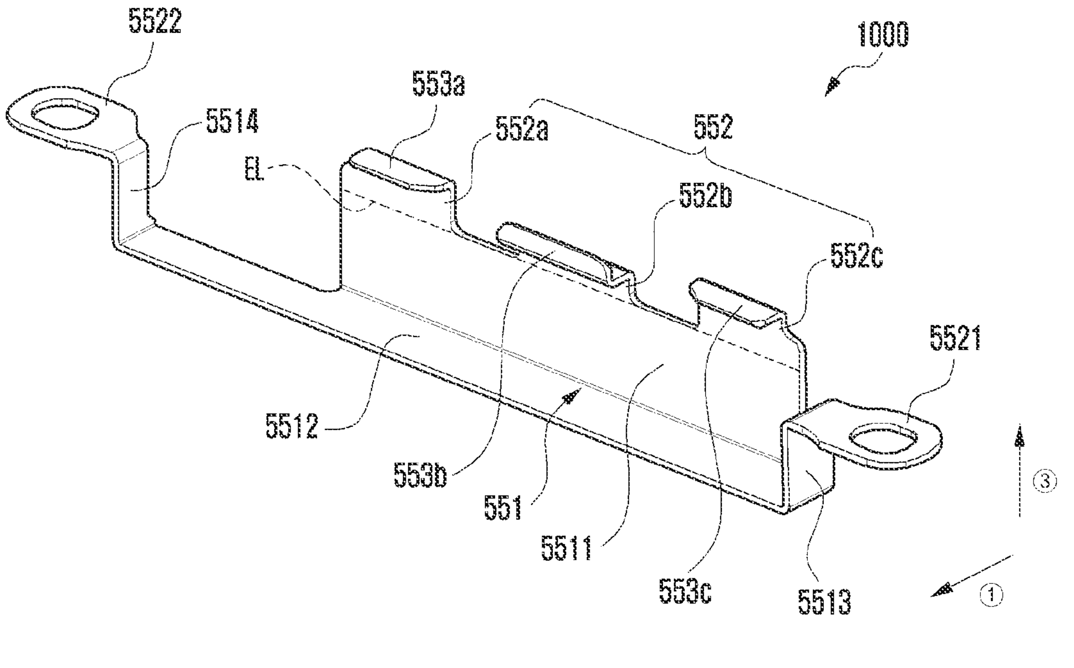
FIG. 10A is a perspective view of a conductive bracket according to various embodiments of the present disclosure.
Figure 10B:
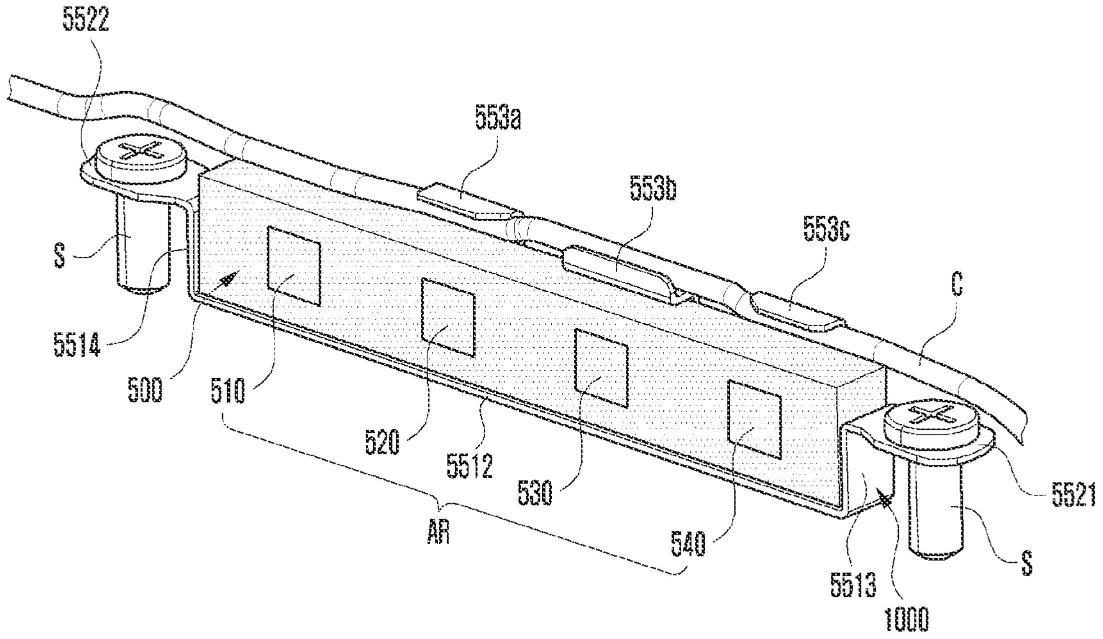
FIG. 10B is a perspective view illustrating a state in which an antenna structure and an electrical connection member are coupled to a conductive bracket according to various embodiments of the present disclosure.
Figure 10C:
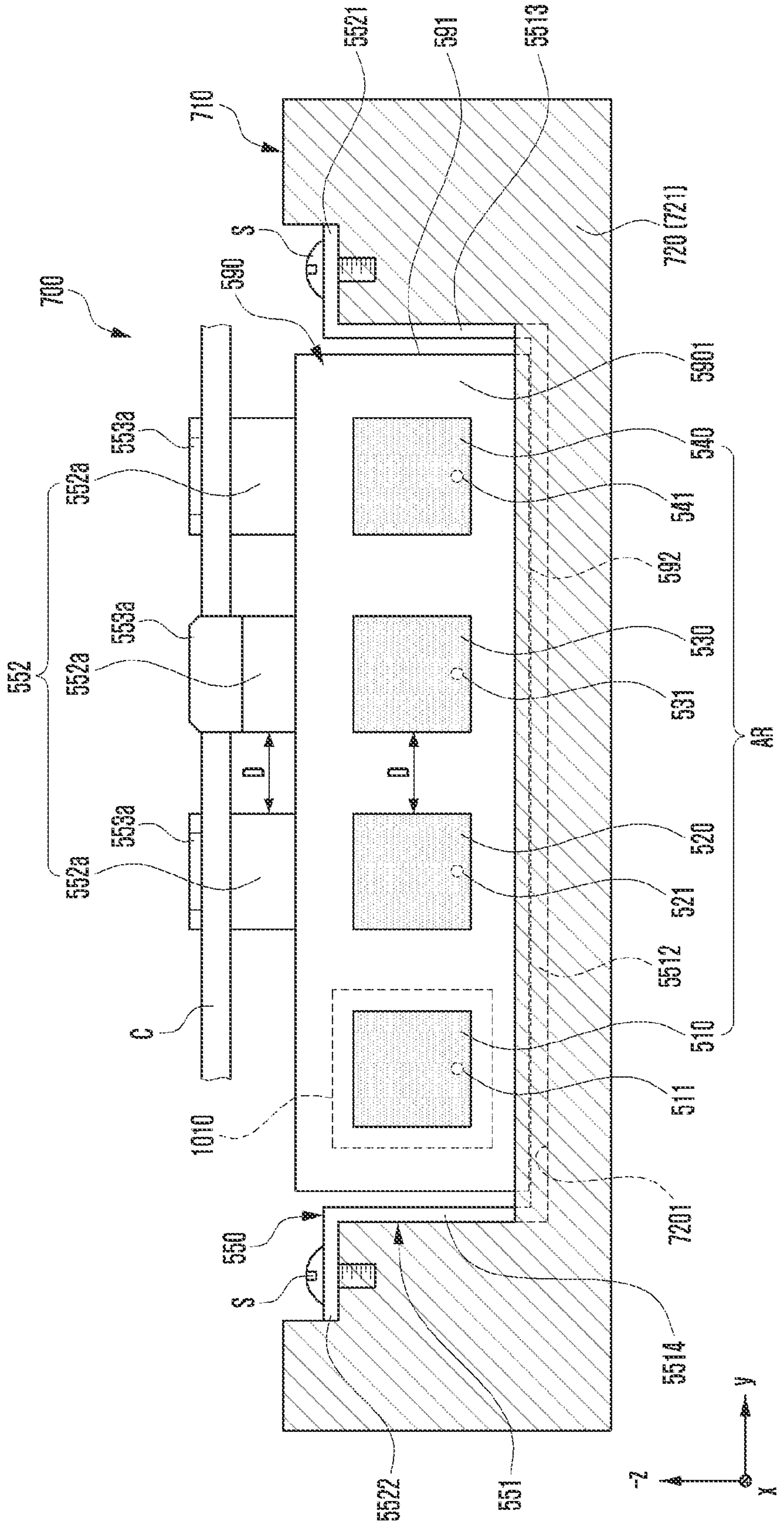
FIG. 10C is a partial cross-sectional view of an electronic device including a conductive bracket according to various embodiments of the present disclosure.

FIG. 10A is a perspective view of a conductive bracket according to various embodiments of the present disclosure. FIG. 10B is a perspective view illustrating a state in which an antenna structure and an electrical connection member are coupled to a conductive bracket according to various embodiments of the present disclosure. FIG. 10C is a partial cross-sectional view of an electronic device including a conductive bracket according to various embodiments of the present disclosure.

In describing the conductive bracket 1000 of FIGS. 10A to 10C, the same reference numerals are assigned to substantially the same components as those of the conductive bracket 550 of FIG. 6, and detailed descriptions thereof may be omitted.

With reference to FIG. 10A, the conductive bracket 1000 may include a conductive plate 551 made of a metal material and at least one fixing part 5521 or 5522 extending outwards from the conductive plate 551 and to be fixed to the conductive member (e.g., the conductive member 721 of FIG. 7B) of the housing (e.g., the housing 710 of FIG. 7B). According to one embodiment, the conductive plate 551 may include a first support part 5511 correspondingly disposed to cover at least a portion of the second substrate surface (e.g., the second substrate surface 5902) of the substrate 590; a second support part 5512 extending from the first support part 5511 and correspondingly disposed to cover at least a portion of the first substrate side surface (e.g., the first substrate side surface 5903*a*); a third support part 5513 extending from one end of the second support part 5512 and correspondingly disposed to cover at least a part of the second substrate side surface (e.g., the second substrate side surface 5903*b*); and a fourth support part 5514 extending from the other end of the second support part 5512 and correspondingly disposed to cover at least a portion of the fourth substrate side surface (e.g., the fourth substrate side surface 5903*d*). According to one embodiment, at least one of the fixing parts 5521 and 5522 may include a first fixing part 5521 extending outwards from the third support part 5513 and a second fixing part 5522 extending outwards from the fourth support part 5514. According to one embodiment, the first fixing part 5521 and the second fixing part 5522 may be fixed to the conductive member (e.g., the conductive member 721 of FIG. 7B) of the housing (e.g., the housing 710 of FIG. 7B) through a fastening member such as a screw (e.g., the screw S of FIG. 7C).

According to various embodiments, the conductive bracket 1000 may include a conductive extension part 552 extending from the first support part 5511 in an upward direction (e.g., direction ③) of the substrate 590. According to one embodiment, the conductive extension part 552 may include a plurality of unit conductive extension parts 552*a*, 552*b*, and 552*c* spaced apart from each other to have a designated distance D along the length direction of the first support part 5511. According to one embodiment, the conductive extension part 552 may include bent parts 553*a*, 553*b*, and 553*c* extending from an end of each of the plurality of unit conductive extension parts 552*a*, 552*b*, and 552*c* toward the substrate. In some embodiments, the plurality of bent parts 553*a*, 553*b*, and 553*c* may be omitted. According to one embodiment, at least a portion of the first support part 5511 may be at least partially omitted in consideration of the disposition relationship of electrical structure such as the connector 1010 disposed on the second substrate surface 5902 of the substrate 590. According to one embodiment, the plurality of unit conductive extension parts 552*a*, 552*b*, and 552*c* may be disposed at positions corresponding to the respective conductive patches 520, 530, and 540 of the array antenna AR. Accordingly, the separation distance D between the plurality of unit conductive extension parts 553*a*, 553*b*, and 553*c* may be substantially the same as the separation distance D between the conductive patches 520, 530, and 540 and may be disposed to correspond to each other.

According to various embodiments, the plurality of bent parts 553*a*, 553*b*, and 553*c* may be used as a support structure for the electric connection member C disposed in an inner space (e.g., the inner space 7001 of FIG. 7B) of an electronic device (e.g., the electronic device 700 of FIG. 7B). According to one embodiment, the electrical connection member C may be supported through a staggered support structure of upper and/or lower surfaces of the bent parts 553*a*, 553*b*, and 553*c* having different heights. For example, the electrical connection member C may include a flexible RF cable (FRC) or a coaxial cable. In some embodiments, to prevent deterioration of radiation performance of the antenna structure 500, the ground line of the electrical connection member C may be electrically connected to the conductive bracket 550.

According to various embodiments, the electronic device (e.g., the electronic device 700 of FIG. 7B) may comprise: a housing (e.g., the housing 710 of FIG. 7B) comprising a conductive member (e.g., the conductive member 721) and a non-conductive member (e.g., the non-conductive member 722) (non-conductive portion) coupled to the conductive member; an antenna structure (e.g., the antenna structure AR of FIG. 7B) disposed in the inner space (e.g. the inner space 7001 of FIG. 7B) of the housing, comprising a substrate (e.g., the substrate 590 of FIG. 6) that includes a first substrate surface (e.g., the first substrate surface 5901 of FIG. 6) facing a first direction (e.g., the first direction (direction ①)), a second substrate surface (e.g., the second substrate surface 5902) facing the opposite direction (e.g., the second direction (direction ②)) to the first substrate surface, and a substrate side surface (e.g., the substrate side surface 5903 of FIG. 6) surrounding a space between the first substrate surface and the second substrate surface, and at least one antenna element (e.g., a plurality of conductive patches 510, 520, 530, and 540 of FIG. 6) disposed to form a beam pattern in the first direction; a first support (e.g., the first support part 5511 of FIG. 6) disposed to at least partially correspond to the second substrate surface in the inner space of the housing; a conductive bracket (e.g., the conductive bracket 550 of FIG. 6) comprising at least one conductive extension part (e.g., the conductive extension part 552 of FIG. 6) disposed higher than the second substrate surface in a direction perpendicular to the first direction from the first support; and a wireless communication circuit (e.g., the wireless communication module 192 of FIG. 1) configured to transmit and/or receive a radio signal in a frequency band specified through the at least one antenna element, and when the housing is viewed from the outside, the antenna structure may be disposed at a position overlapping at least partially with the non-conductive member.

According to various embodiments, the at least one conductive extension part may be integrally formed with the first support part of the conductive bracket.

According to various embodiments, the at least one conductive extension part may include a conductive structure adjacent to or in contact with the first support part.

According to various embodiments, the conductive structure may include at least one of at least a portion of the conductive member or a shield can for shielding noise disposed in the inner space.

According to various embodiments, the at least one conductive extension part may extend from the substrate to have a length ranging from 0 to λ/2, where λ is the length corresponding to the frequency band of the antenna structure.

According to various embodiments, the at least one antenna element may include a plurality of antenna elements spaced apart at specified intervals on the substrate, and the at least one conductive extension part may be formed to have a corresponding length to at least a total disposition length of the plurality of antenna elements.

According to various embodiments, the at least one conductive extension part may further include a bent part bent toward the substrate.

According to various embodiments, the sum of the extended length of the extension part and the bending length of the bent part may be formed to have a length ranging from 0 to λ/2.

According to various embodiments, the at least one conductive extension part may include a plurality of unit conductive extension parts spaced apart from each other at specified intervals along the length direction of the substrate.

According to various embodiments, the plurality of unit conductive extension parts may be integrally formed with the first support part.

According to various embodiments, the at least one antenna element may include a plurality of antenna elements spaced apart at specified intervals on the substrate, and the plurality of unit conductive extension parts may be disposed at positions corresponding to the plurality of antenna elements.

According to various embodiments, each of the plurality of unit conductive extension parts may include a bent part extending in a direction of the substrate to a specified length.

According to various embodiments, the at least one antenna element may include a plurality of antenna elements spaced apart at specified intervals in the substrate, and a space between the bent parts, when viewed from above, may overlap with the space between the plurality of antenna elements.

According to various embodiments, an electrical connection member disposed to be supported through the bent parts may be further included.

According to various embodiments, the ground line of the electrical connection member may be electrically connected to the conductive bracket.

According to various embodiments, the substrate side surface may include a first substrate side surface having a first length; a second substrate side surface extending perpendicularly from the first substrate side surface and having a second length shorter than the first length; a third substrate side surface extending parallel to the first substrate side surface from the second substrate side surface and having a first length; and a fourth substrate side surface extending parallel to a second substrate side surface from the third substrate side surface and having a second length, and at least one antenna element may include a plurality of antenna elements spaced apart at specified intervals along the first length.

According to various embodiments, the conductive bracket may include a conductive plate, and the conductive plate may include a first support part supporting the first substrate surface; a second support part extending from the first support part and supporting the first substrate side surface; a third support part extending from the first support part and corresponding to the third substrate side surface, and a fourth support part extending from the first support part and corresponding to the fourth substrate side surface, wherein the at least one conductive extension part may include further a bent part extending from the first support part and bent to at least partially correspond to the third substrate side surface.

According to various embodiments, the housing may include a front surface plate; a rear surface plate facing a second direction opposite to the front surface plate; and a lateral member surrounding the inner space between the front surface plate and the rear surface plate, and a display disposed to be at least partially visible from the outside through the front surface plate may be further included.

According to various embodiments, the substrate may be disposed to form a beam pattern in a direction in which the lateral member faces in the inner space.

According to various embodiments, at least a portion of the lateral member may form at least a portion of a side surface of the electronic device disposed to be visible from the outside.

Various embodiments of the present disclosure disclosed in the present specification and drawings are merely presented as specific examples to easily explain the technical content of the present disclosure and help the understanding of the present disclosure, but they are not intended to limit the scope of the present disclosure. Therefore, the scope of the present disclosure should be interpreted to include all changes or modifications derived based on the technical ideals of the present disclosure in addition to the embodiments disclosed herein.

The invention claimed is:

1. An electronic device comprising:

a housing comprising a conductive member and a non-conductive member coupled to the conductive member;

an antenna structure disposed in the inner space of the housing, comprising a substrate that includes a first substrate surface facing a first direction, a second substrate surface facing a second direction opposite to the first substrate surface, and a substrate side surface surrounding a space between the first substrate surface and the second substrate surface, and at least one antenna element disposed to form a beam pattern in the first direction;

a conductive bracket comprising a first support part disposed to at least partially correspond to the second substrate surface in the inner space of the housing and at least one conductive extension part extending higher than the second substrate surface in a third direction perpendicular to the first direction from the first support part, the conductive extension part having a length selected such that, when the antenna structure is installed in the conductive bracket, a gap remains between a portion of the conductive extension part and the substrate side surface along the third direction; and a wireless communication circuit configured to transmit and/or receive a radio signal in a frequency band specified through the at least one antenna element, and when the housing is viewed from the outside, the antenna structure may be disposed at a position overlapping at least partially with the non-conductive member.

2. The electronic device of claim 1, wherein the at least one conductive extension part is integrally formed with the first support part of the conductive bracket.

3. The electronic device of claim 1, wherein the at least one conductive extension part comprises a conductive structure that is adjacent to or in contact with the first support part.

4. The electronic device of claim 3, wherein a conductive structure comprises at least one of at least a portion of the conductive member or a shield can for shielding noise disposed in the inner space.

5. The electronic device of claim 1, wherein the at least one conductive extension part extends from the substrate to have a length ranging from 0.18λ to λ/2, where λ comprises the length corresponding to the frequency band of the antenna structure.

6. The electronic device of claim 1, wherein the at least one antenna element comprises a plurality of antenna elements spaced apart at specified intervals in the substrate, and the at least one conductive extension part is formed to have a corresponding length to at least a total disposition length of the plurality of antenna elements.

7. The electronic device of claim 1, wherein the at least one conductive extension part further comprises a bent part bent in the first direction.

8. The electronic device of claim 7, wherein the sum of the extending length of the extension part and the bending length of the bent part is formed to have a length ranging from 0.18λ to λ/2, where λ comprises the length corresponding to the frequency band of the antenna structure.

9. The electronic device of claim 1, wherein the at least one conductive extension part comprises a plurality of unit conductive extension parts spaced apart from each other at specified intervals along the length direction of the substrate.

10. The electronic device of claim 9, wherein the plurality of unit conductive extension parts are integrally formed with the first support part.

11. The electronic device of claim 9, wherein the at least one antenna element comprises a plurality of antenna elements spaced apart at specified intervals in the substrate, and the plurality of unit conductive extension parts are disposed at positions corresponding to the plurality of antenna elements.

12. The electronic device of claim 9, wherein each of the plurality of unit conductive extension parts comprises a bent part extending to a designated length in the first direction.

13. The electronic device of claim 12, wherein the at least one antenna element comprises a plurality of antenna elements spaced apart at specified intervals in the substrate, and a space between the bent parts overlaps with a space between the plurality of antenna elements when the bent part is viewed from above.

14. The electronic device of claim 12, further comprising an electrical connecting member disposed to be supported through the bent parts.

15. The electronic device of claim 14, wherein the ground line of the electrical connection member is electrically connected to the conductive bracket.

16. The electronic device of claim 1, wherein the substrate side surface further comprises:

a first substrate side surface having a first length;

a second substrate side surface extending perpendicularly from the first substrate side surface and having a second length shorter than the first length;

a third substrate side surface extending parallel to the first substrate side surface from the second substrate side surface and having the first length; and a fourth substrate side surface extending parallel to a second substrate side surface from the third substrate side surface and having the second length, and wherein the at least one antenna element includes a plurality of antenna elements spaced apart at specified intervals along the first length.

17. The electronic device of claim 16, wherein the conductive bracket further includes a conductive plate, the conductive plate comprising:

a first support part supporting the first substrate surface;

a second support part extending from the first support part and supporting the first substrate side surface;

a third support part extending from the first support part and corresponding to the third substrate side surface, and a fourth support part extending from the first support part and corresponding to the fourth substrate side surface, wherein the at least one conductive extension part may include further a bent part extending from the first support part and bent to at least partially correspond to the third substrate side surface.

18. The electronic device of claim 1, wherein the housing includes a front surface plate, a rear surface plate facing a direction opposite to the front surface plate and a lateral member surrounding the inner space between the front surface plate and the rear surface plate, and further comprising a display disposed to be at least partially visible from the outside through the front surface plate.

19. The electronic device of claim 18, wherein the substrate is disposed to form a beam pattern in a direction in which the lateral member faces in the inner space.

20. The electronic device of claim 19, wherein at least a portion of the lateral member configured to form at least a portion of a side surface of the electronic device disposed to be visible from the outside.

* * * * *